US012703647B2

(12) United States Patent
Deng et al.

(10) Patent No.: US 12,703,647 B2
(45) Date of Patent: Aug. 11, 2026

(54) ACCELERATED SYNTHESIS OF NICKEL-RICH CATHODE MATERIALS USING FLAME-ASSISTED SPRAY PYROLYSIS

(71) Applicant: Massachusetts Institute of Technology, Cambridge, MA (US)

(72) Inventors: Sili Deng, Cambridge, MA (US); Jianan Zhang, Cambridge, MA (US); Valerie L Muldoon, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 660 days.

(21) Appl. No.: 18/176,630

(22) Filed: Mar. 1, 2023

(65) Prior Publication Data

US 2023/0278888 A1 Sep. 7, 2023

Related U.S. Application Data

(60) Provisional application No. 63/317,130, filed on Mar. 7, 2022.

(51) Int. Cl.
*C01G 53/50* (2025.01)
*C01G 53/82* (2025.01)

(52) U.S. Cl.
CPC ............. *C01G 53/50* (2013.01); *C01G 53/82* (2025.01); *C01P 2006/40* (2013.01)

(58) Field of Classification Search
CPC ................................. C01G 1/02; C01G 53/50
See application file for complete search history.

(56) References Cited

U.S. PATENT DOCUMENTS

| | | | | |
|---|---|---|---|---|
| 9,748,567 | B2 * | 8/2017 | Elhassid | C01G 53/50 |
| 10,384,940 | B2 * | 8/2019 | Katusic | C01G 1/02 |
| 11,434,146 | B2 * | 9/2022 | Kress | C01B 13/34 |
| 2013/0045158 | A1 * | 2/2013 | Katusic | C01G 51/42 423/594.15 |
| 2017/0275166 | A1 * | 9/2017 | Katusic | C01G 51/04 |
| 2025/0002371 | A1 * | 1/2025 | Belharouak | C01G 53/04 |
| 2025/0215608 | A1 * | 7/2025 | Deng | B01J 23/755 |

FOREIGN PATENT DOCUMENTS

| | | | | |
|---|---|---|---|---|
| CN | 112479266 A | | 3/2021 | |
| CN | 113784918 A | * | 12/2021 | C01G 53/50 |
| CN | 114212834 A | * | 3/2022 | H01M 4/505 |
| KR | 20190020992 A | * | 3/2019 | C01G 53/50 |
| WO | WO-2014159118 A1 | * | 10/2014 | C01G 53/42 |
| WO | WO-2019020724 A1 | * | 1/2019 | H01M 4/625 |
| WO | WO-2023/172828 A1 | | 9/2023 | |

(Continued)

OTHER PUBLICATIONS

Machine translation of CN 11421283 (no date) (Year: 0000).*

(Continued)

*Primary Examiner* — Amanda C. Walke
(74) *Attorney, Agent, or Firm* — Foley Hoag LLP; Dana M. Gordon; Tesia V. Chciuk

(57) ABSTRACT

Methods of synthesis of nickel-rich cathode materials can include preheating droplets, decomposing the droplets in a burner, collecting solid particles, and calcinating the solid particles.

24 Claims, 20 Drawing Sheets

(56) References Cited

FOREIGN PATENT DOCUMENTS

WO WO-2023/172830 A2 9/2023

OTHER PUBLICATIONS

Machine translation of KR 20190020992 (no date) (Year: 0000).*

Machine translation of WO 2019020724 (no date) (Year: 0000).*

Gao et al., "High-quality LiNi0.8Co0.15Al0.05O2 cathode with excellent structural stability: Suppressed structural degradation and pore defects generation", Nano Energy, vol. 73, Apr. 15, 2020, p. 104798.

International Search Report and Written Opinion for International Application No. PCT/US23/63438 dated Jul. 20, 2023.

International Search Report and Written Opinion for International Application No. PCT/US23/63447 dated Sep. 8, 2023.

Julien et al., "NCA, NCM811, and the Route to Ni-Richer Lithium-Ion Batteries", Energies, vol. 13, Dec. 2, 2020. Retrieved from the Internet: <URL: https://www.mdpi.com/1996-1073/13>.

Li et al., "Spray pyrolysis synthesis of nickel-rich layered cathodes LiNi1?2xCoxMnxO2 (x=0.075, 0.05, 0.025) for lithium-ion batteries", Journal of Energy Chemistry, vol. 27, No. 2, Mar. 1, 2018, pp. 447-450.

Lu et al., "Single-Crystal Nickel-Based Cathodes: Fundamentals and Recent Advances", Electrochemical Energy Reviews, vol. 5, Sep. 26, 2022. Retrieved from the Internet: <URL: https://doi.org/10.1007/s41918-022-00166-2>.

Wang et al., "Grain size regulation for balancing cycle performance and rate capability of LiNi0.9Co0.055Mn0.045O2 single crystal nickel-rich cathode materials", Journal of Energy Chemistry, vol. 65, Jun. 19, 2021. Retrieved from the Internet: <URL: https://www.sciencedirect.com/science/article/abs/pii/S2095495621003600>.

Zhang et al., "Accelerated synthesis of Li(Ni0.8Co0.1Mn0.1)O2 cathode materials using flame-assisted spray pyrolysis and additives", Journal of Power Sources, vol. 528, Mar. 2, 2022, p. 231244.

* cited by examiner

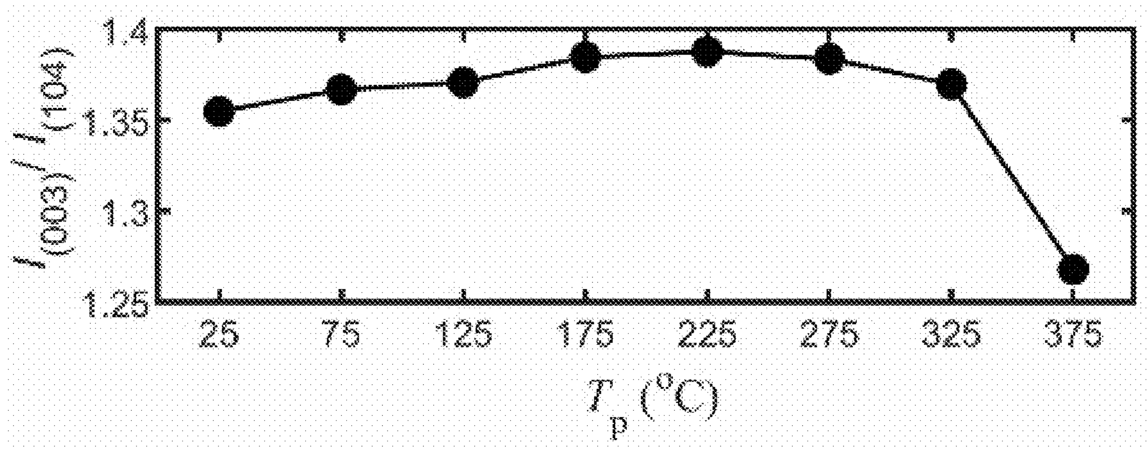
FIG. 4C
FIG. 4D
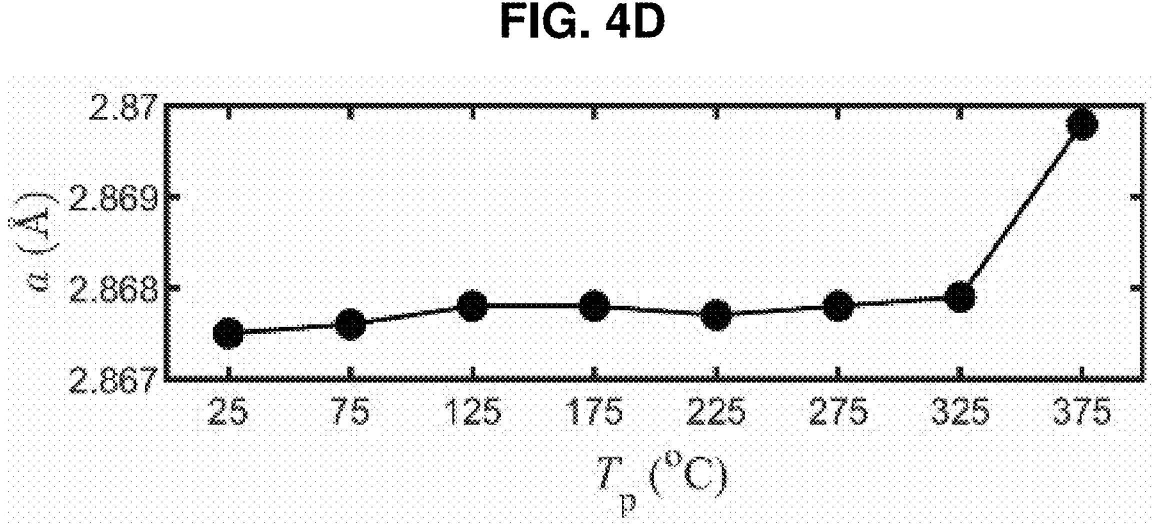
FIG. 4E

ACCELERATED SYNTHESIS OF NICKEL-RICH CATHODE MATERIALS USING FLAME-ASSISTED SPRAY PYROLYSIS

CLAIM OF PRIORITY

This application claims priority to U.S. Provisional Patent Application No. 63/317,130, filed Mar. 7, 2022, which is incorporated by reference in its entirety.

FIELD OF THE INVENTION

The invention relates to synthesis of materials using flame-assisted spray pyrolysis.

BACKGROUND

Li-ion batteries (LIBs) are an essential element of transportation electrification and grid energy storage of sustainable energy due to their high energy density and efficiency. However, the high cost of LIBs is one of the main challenges for large-scale commercial applications such as electric vehicles (EVs). To meet the urgent needs for cost reduction, the development of cathode materials is critical, because they are the main contributor to battery cost and the limitation of the battery capacity (Ref. 1). Among different cathode materials, lithium-nickel-cobalt-manganese oxide (NCM) is one of the currently most widely used. To meet the requirement of high energy density, nickel-srich cathode materials have increasing popularity and importance in practical applications. Unfortunately, the synthesis process of nickel-rich cathode materials is time-consuming and energy-intensive, leading to the high manufacturing cost (Ref 2).

SUMMARY

This Summary introduces a selection of concepts in simplified form that are described further below in the Detailed Description. This Summary neither identifies key or essential features, nor limits the scope, of the claimed subject matter.

One aspect of the disclosure herein is a method of synthesis of nickel-rich cathode material can include:

- preparing a precursor solution by dissolving lithium nitrate, nickel nitrate, manganese nitrate, and cobalt nitrate in water;
- aerosolizing the precursor solution of in a stream of air using an ultrasonic sprayer to form droplets;
- preheating the droplets;
- generating a premixed methane flame in a co-flow burner;
- decomposing the droplets by passing through the inner tube of theco-flow burner;
- depositing solid particles on a powder collector; and
- calcinating the solid particles in a furnace in the presence of an oxidizing agent.

In another aspect, a method of synthesis of nickel-rich cathode material can include forming droplets of a precursor solution including a nickel salt in a stream of air, preheating the droplets, generating a flame in a burner, decomposing the droplets by passing through the burner, and collecting solid particles on a powder collector. In certain circumstances, the method can include calcinating the solid particles in a furnace in the presence of an oxidizing agent.

In another aspect, a nickel-rich cathode material including a plurality of dense spherical lithium-nickel-cobalt-manganese oxide particles substantially free of hollow particles, broken particles and particles with holes on a surface of the particles.

In certain circumstances, the method can include adding excess $LiNO_3$ to the precursor solution.

In certain circumstances, the nickel-rich cathode material can include lithium-nickel-cobalt-manganese oxide (NCM).

In certain circumstances, the nickel nitrate of the precursor solution can include nickel nitrate hexahydrate ($Ni(NO_3)_2 \cdot 6H_2O$).

In certain circumstances, the manganese nitrate of the precursor solution can include manganese nitrate tetrahydrate ($Mn(NO_3)_2 \cdot 4H_2O$).

In certain circumstances, the cobalt nitrate of the precursor solution can include cobalt nitrate hexahydrate ($Co(NO_3)_2 \cdot 6H_2O$).

In certain circumstances, preheating the droplets can include tuning the morphology and electrochemical performance of the nickel-rich cathode material by adjusting a preheating temperature and preheating time.

In certain circumstances, the droplets can be passed through a preheating zone at a flow rate of between 5 L/min and 20 L/min, for example, at a flow rate of about 10 L/min.

In certain circumstances, preheating the droplets can include exposing the droplets to a temperature of 125° C. to 325° C.

In certain circumstances, the droplets can be passed through the co-flow burner at a flow rate of about 10 L/min.

In certain circumstances, the solid particles can be calcinated for up to 20 minutes at about 875° C.

In certain circumstances, the nickel-rich cathode material can include an ordered layered structure.

In certain circumstances, the nickel-rich cathode material can include $LiNi_{0.8}Co_{0.1}Mn_{0.1}O_2$(NCM811) or $LiNi_{0.6}Co_{0.2}Mn_{0.2}O_2$(NCM822).

In certain circumstances, the nickel-rich cathode material can have a discharge capacity of greater than 180 mAh/g (1st cycle at 0.1 C).

In certain circumstances, the nickel-rich cathode material can have a discharge capacity is about 198.3 mAh/g (1st cycle at 0.1 C).

In certain circumstances, the nickel-rich cathode material can have a capacity retention ratio of about 63.15% after 50 cycles at 1 C.

In certain circumstances, the nickel-rich cathode material can have a coulombic efficiency of greater than 80%

In certain circumstances, the method can include a liquid-feed flame assisted spray pyrolysis (FASP) method.

In certain circumstances, the method can be a continuous-flow process.

In certain circumstances, the ultrasonic sprayer can be a 1.7 MHz ultrasonic sprayer.

In certain circumstances, the preheating of the droplets can include heating by passage through two low-temperature preheating sections.

In certain circumstances, the depositing solid particles on a filter can include depositing the solid particles on a glass-fiber filter.

The following Description references the accompanying drawings which form a part this application, and which show, by way of illustration, specific example implementations. Other implementations may be made without departing from the scope of the disclosure.

BRIEF DESCRIPTION OF THE DRAWINGS

FIGS. 4A-4F are graphs. FIG. 4A is a graph depicting XRD patterns of calcinated samples with different preheating temperatures. FIG. 4B is a graph depicting enlarged XRP patterns showing the peak pair of (018)/(110). FIG. 4C is a graph depicting the ratio of lattice parameter c/a. FIG. 4D is a graph depicting the ratio of the intensity of peak (103) to (104). FIG. 4E is a graph depicting the change of lattice parameter a with $T_p$. FIG. 4F is a graph depicting the change of lattice parameter c with $T_p$.

DESCRIPTION

Figure 1:
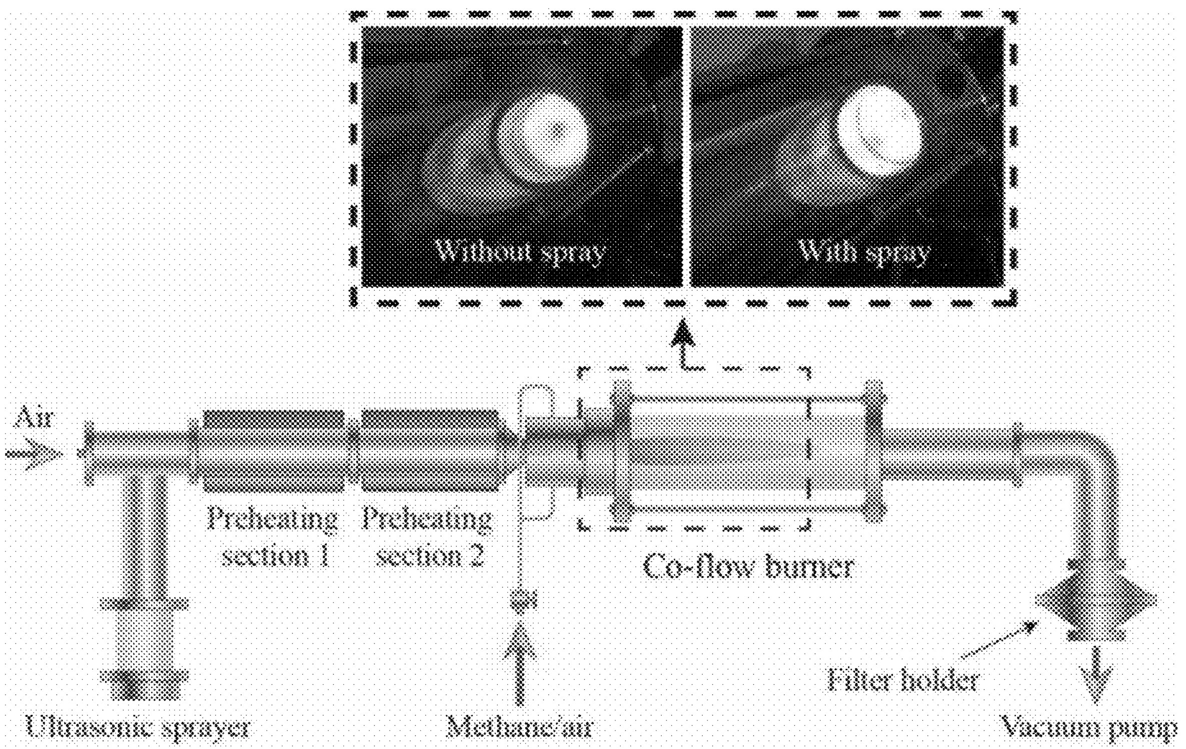
FIG. 1 is a schematic drawing depicting an experiment setup. The inserted photos show two different burner conditions with and without the precursor spray.

Reference numbers in parenthesis "(Ref.)" herein refer to the corresponding literature listed in the attached Bibliography which forms a part of this Specification, and the literature is incorporated by reference herein.

A flame-assisted spray pyrolysis (FASP) method for cathode material synthesis can significantly reduce the calcination time, leading to energy savings and cost reductions.

The nickel-rich cathode materials with ordered layered structure can be synthesized with co-precipitation (Ref 3), hydrothermal (Ref. 4), and spray-based methods (Refs. 5 and 6). Although there are significant differences among these routes, an essential step required by all is the long-time calcination, usually 10-20 hours, to form the desired crystal structure. Consequently, the synthesis process of the cathode materials is time-consuming and energy-intensive, leading to the high manufacturing cost (Ref. 2). In contrast, the method disclosed herein only uses only 20 minutes of calcination at 875° C. without any preheating and ramping steps to synthesize materials with desired performance as shown in Table 1. As a result, the overall synthesis time can be reduced by one order of magnitude when compared with other methods, leading to significant energy and cost reduction.

A method of synthesis of nickel-rich cathode material can include forming droplets of a precursor solution including a nickel salt in a stream of air, preheating the droplets, generating a flame in a burner, decomposing the droplets by passing through the burner, and collecting solid particles on a powder collector. The burner can be a co-flow burner. The decomposing can take place in an inner tube of the co-flow burner.

In certain circumstances, the solid particles can be calcinated in the presence of an oxidizing agent, such as oxygen or oxygen mixed with an inert gas (e.g., helium or argon). The calcination can be in a furnace. Surprisingly, controlling the time and temperature of calcination can produce nickel-rich materials having superior electrochemical and morphology properties well suited for battery applications. The calcination time can be less than 5 hours, less than 4 hours, less than 3 hours, less than 2 hours, less than 1 hour, less than 45 minutes, or less than 30 minutes. The calcination time can be greater than 5 minutes, greater than 10 minutes, greater than 15 minutes, or greater than 20 minutes. The calcination time can be an hour or less, less than 50 minutes, less than 40 minutes, or less than 30 minutes. For example, the calcination time can be about 20 minutes. The calcination temperature can be less than 1000° C., less than 950° C., or less than 900° C. The calcination temperature can be greater than 700° C., greater than 750° C., greater than 800° C., or greater than 850° C. In certain embodiments, the calcination temperature can be between 800° C. and 900° C. held for 15 to 30 minutes. For example, the calcination temperature can be about 875° C. less. In certain circumstances, calcination can be performed without any preheating and ramping steps to synthesize materials with desired performance.

The method can include introducing a preheating section prior to the high-temperature flame in the synthesis setup. The preheating temperature can be well controlled and the morphology and electrochemical performance can be tuned.

In certain circumstances, preheating the droplets can include tuning the morphology and electrochemical performance of the nickel-rich cathode material by adjusting a preheating temperature and preheating time. The preheating time can be controlled by adjusting the flow rate of gas passing through a preheating zone. For example, the droplets can be passed through a preheating zone at a flow rate of greater than 5 L/min, greater than 7 L/min, or greater than 10 L/min, less than 20 L/min, or less than 15 L/min. For example, the flow rate can be between 5 L/min and 20 L/min. In certain circumstance, the flow rate can be about 10 L/min. The preheating temperature can be less than 375° C., less than 350° C., less than 325° C., less than 300° C., less than 275° C., less than 250° C., or less than 225° C. The preheating temperature can be greater than 75° C., greater than 100° C., greater than 125° C., greater than 150° C., greater than 175° C., or greater than 200° C. For example, the preheating temperature can be between 125° C. and 325° C.

In certain circumstances, a method of synthesis of nickel-rich cathode materials can include preparing a precursor solution by dissolving lithium nitrate, nickel nitrate, manganese nitrate, and cobalt nitrate in water. The water can be deionized water. For example, a precursor solution can be prepared by dissolving lithium nitrate ($LiNO_3$), nickel nitrate hexahydrate ($Ni(NO_3)_2 \cdot 6H_2O$), manganese nitrate tetrahydrate ($Mn(NO_3)_2 \cdot 4H_2O$), and cobalt nitrate hexahydrate ($Co(NO_3)_2 \cdot 6H_2O$) in deionized water. In certain circumstances, excess $LiNO_3$ can be added to compensate for the lithium loss during the synthesis process. The excess lithium salt can be 2%, 3%, 4%, 5%, 6%, 7%, 8%, 9%, 10%, 11%, 12%, 13%, 14% or 15% excess of the final composition stoichiometry.

Other additives can be used to optimize the precursor solution performance. For example, a nitrogen-containing species can be added to the precursor solution. The nitrogen-containing species can be a compound including an amide group or urea group. For example, the additive can be urea or polyvinylpyrrolidone. In certain circumstances, the precursor solution can include 0.5 wt %, 1.5 wt %, 1.0 wt %, 1.5 wt %, 2.0 wt %, 2.5 wt %, 3.0 wt %, 3.5 wt %, or 4.0 wt % of the additive. The additive can help control the droplet evaporation and decomposition process.

In certain circumstances, a method of synthesis of nickel-rich cathode materials can include forming droplets. Forming droplets can include spraying or aerosolizing the precursor solution of in a stream of air to form droplets. Spraying or aerosolizing the precursor can be accomplished using an ultrasonic sprayer, such as a 1.7 MHz ultrasonic sprayer. The droplets can then be preheated as described above. Preheating can include a two-stage preheating zone of a synthesis system. For example, preheating of the droplets can include heating by passage through two low-temperature preheating sections.

In certain circumstances, the preheated droplets can be decomposed in a flame of a burner. The droplets can then be decomposed in a burner, such as a co-flow burner. In certain circumstances, partially dried particles can enter a co-flow burner for decomposition. The co-flow burner can combust premixed methane and air. The decomposed droplets form solid particles that can be collected or deposited on a powder collector. The powder collector can be a continuous flow particle separator or a filter, such as a glass-fiber filter. The collected power can be calcinated as described above.

In certain circumstances, the method can include a liquid-feed flame assisted spray pyrolysis (FASP) method. For example, a system can include a 1.7 MHz homemade ultrasonic sprayer, two low-temperature preheating sections, a co-flow burner, and a filter powder collector.

In certain circumstances, the method can be a continuous-flow process.

In another aspect, a nickel-rich cathode material including a plurality of dense spherical lithium-nickel-cobalt-manganese oxide particles substantially free of hollow particles, broken particles and particles with holes on a surface of the particles. For example, the preheating can control solvent evaporation to prevent formation of broken particles, hollow particles, or holes on surfaces. Advantageously, well-formed precursor particles can inhibit the formation of hard-to-break agglomerations in calcinated powders.

In certain circumstances, the nickel-rich cathode material can include lithium-nickel-cobalt-manganese oxide (NCM). In certain circumstances, the nickel-rich cathode materials can include an ordered layered structure. In certain circumstances, the nickel-rich cathode materials can include $LiNi_{0.8}Co_{0.1}Mn_{0.1}O_2$ (NCM811) or $LiNi_{0.6}Co_{0.2}Mn_{0.2}O_2$ (NCM822).

In certain circumstances, the nickel-rich cathode material can have a discharge capacity of greater than 175 mAh/g, greater than 180 mAh/g, greater than 181 mAh/g, greater than 182 mAh/g, greater than 183 mAh/g, greater than 184 mAh/g, greater than 185 mAh/g, greater than 186 mAh/g, greater than 187 mAh/g, greater than 188 mAh/g, greater than 189 mAh/g, greater than 190 mAh/g, greater than 191 mAh/g, greater than 192 mAh/g, or greater than 193 mAh/g ($1^{st}$ cycle at 0.1 C). For example, the nickel-rich cathode material can have a discharge capacity is about 198.3 mAh/g ($1^{st}$ cycle at 0.1 C).

In certain circumstances, the nickel-rich cathode material can have a capacity retention ratio of greater than 50%, greater than 55%, greater than 60%, or about 63.15% after 50 cycles at 1 C.

In certain circumstances, the nickel-rich cathode material can have a coulombic efficiency of greater than 80%, greater than 85%, greater than 90%, or greater than 95%.

The schematic of the experimental setup is shown in FIG. 1. The main components of the material synthesis system are a 1.7 MHz homemade ultrasonic sprayer, two low-temperature preheating sections, a co-flow burner, and a filter powder collector. Droplets from the sprayer were carried to the low-temperature preheating zones by air at a constant flow rate of 10 L/min. Then, the partially dried particles entered the co-flow burner for decomposition, and the burner used premixed methane and air. The inserted photos show two different burner conditions with and without the precursor burner used premixed methane and air spray. Solid particles were generated after passing through the flame and were subsequently deposited on a glass fiber filter. The collected powder was then calcinated in a tube furnace using oxygen. Before calcination, the furnace was first heated up to the set temperature for fast calcination tests. Then, an alumina crucible with the sample was placed into the tube furnace and calcinated. After a set amount of time, the crucible was removed immediately from the furnace. Finally, once cooled down to room temperature, the sample was collected for testing.

The FASP method disclosed herein is a promising candidate for cathode material production due to the continuous flow condition and simple operation system. The method disclosed herein has the potential for large scale production considering the successful application of flame spray pyrolysis (FSP) in commercially producing $TiO_2$ and carbon black at the rate of tons per hour (Ref. 13).

Moreover, based on the great advantage of the method disclosed herein in simplifying the synthesis process and reducing the cost, the method disclosed herein has great potential in promoting low-cost LIBs.

TABLE 1

Comparison of the half-cell performance of pristine NCM811.

| Method | Calcination temperature and time | Discharge capacity (mAh/g) | Capacity retention ratio | Ref. |
|---|---|---|---|---|
| Co-precipitation | 450° C. for 6 h and then 800° C. for 12 h | 195.3 (1st cycle at 0.2 C) | 68.2% after 100 cycles at 1 C | (Ref. 7) |
| Co-precipitation | 750° C. for 15 hours | 203 (1st cycle at 0.1 C) | 70.2% after 100 cycles at 0.5 C | (Ref. 3) |
| Co-precipitation | 500° C. for 6 h and then 800° C. for 15 hours | 200.9 (1st cycle at 0.1 C) | 78% after 100 cycles at 0.2 C | (Ref. 8) |

TABLE 1-continued

Comparison of the half-cell performance of pristine NCM811.

| Method | Calcination temperature and time | Discharge capacity (mAh/g) | Capacity retention ratio | Ref. |
|---|---|---|---|---|
| Commercial | Not reported* | ~195 (1st cycle at 0.1 C) | 63.8% after 100 cycles at 1 C | (Ref. 9) |
| Commercial | Not reported* | 206 (1st cycle at 0.1 C) | 63.15% after 50 cycles at 1 C | (Ref. 10) |
| Commercial | Not reported* | ~195 (1st cycle at 0.1 C) | 68.7% after 100 cycles at 1 C | (Ref. 11) |
| Commercial | Not reported* | 204.7 (1st cycle at 0.1 C) | 89.2% after 100 cycles at 0.5 C | (Ref 12) |
| FASP | 875° C. for 20 minutes without preheating and ramping steps | 198.3 (1st cycle at 0.1 C) | 83.3% after 100 cycles at 1C | this work |

*Although the calcination condition of the commercial NCM811 was not reported, it is believed to be co-precipitation and similar to other co-precipitation works.

Different trends were noticed between NCM and NCM with 2.5 wt % Urea (NCM-Urea) in 1 h tests. NCM shows that raising the calcination temperature to 825° C. improves the ordering of the layered structure, whereas a further increase of the temperature to 850° C. worsens the structural ordering. In contrast, increasing the temperature continuously improves the structural ordering of NCM-Urea, thereby implying that the temperature rise is preferred for NCM-Urea to form an ordered layered structure. Calcination with increased temperature was less likely to stimulate cation mixing in NCM-Urea samples than NCM samples. Overall, the analysis of structural parameters demonstrates that NCM-Urea can be more suitable than NCM for high-temperature and short-time calcination.

Noticeable differences between NCM and NCM-Urea are in cases with 1 h calcination. For NCM, the retention ratio after 100 cycles at 1 C shows a large variation from 58.1% to 71.6% and then to 47.6% for calcination temperatures of 800° C., 825° C., and 850° C., respectively. In contrast, the retention ratio of NCM-Urea at 1 C shows minor changes from 82.3% to 85.6% and then slightly decreases to 82.3% for calcina-tion temperatures of 800° C., 825° C., and 850° C., respectively. Different from the retention ratio trends, changes in the discharge capacity of NCM-Urea are negligible when the temperature changes. Overall, NCM with 1 h holding time shows high sensitivity to the calcination temperature with notable changes in the discharge capacity and retention ratio. On the other hand, with the addition of urea in the precursor, the synthesized sample allows for a significant reduction in time without sacrificing performance. The electrochemical performance is consistent with the trends found with in situ and ex situ XRD, further confirming that NCM-Urea is suitable for high-temperature and short-time calcination.

The mechanism of the significant difference between NCM and NCM-Urea for short-time calcination is discussed as follows. The current synthesis route involves a FASP step and a calcination step. During FASP, droplets experience solvent evaporation, solute precipitation, and solute decomposition to form as-synthesized particle cathode materials.

NCM needs a long preheating and calcination process for lithiation and cation ordering to achieve desired electrochemical performance. In contrast, NCM-Urea has a uniform lithium distribution that allows fast lithiation and cation ordering. As a result, NCM-Urea can withstand more severe calcination conditions and requires less time while also maintaining its electrochemical performance.

Reducing the cost and improving the performance of lithium-ion batteries (LIBs) are crucial for their applications in transportation electrification and grid energy storage. Much research effort has been devoted to develop novel synthesis methods for LIB cathodes, since traditional methods such as coprecipitation suffer long synthesis time and complex steps. In contrast, flame-based spray methods have great potential in manufacturing LIB cathode materials due to their features such as continuous, fast, and scalable operation. Nevertheless, flame-based spray methods also need improvement in controlling the morphology and improving the electrochemical performance of LIBs. As described herein, a modified flame-assisted spray pyrolysis (FASP) method can use a preheating section for morphology control and electrochemical performance enhancement. The goal is to investigate the effect of preheating temperature on the particle morphology and electrochemical performance of $Li(Ni_{0.8}Co_{0.1}Mn_{0.1})O_2$(NCM811) cathode materials. Results showed that the preheating temperature could significantly alter the particle morphology by affecting the drying process. X-ray diffraction measurements demonstrated that the cation mixing level of NCM811 samples was sensitive to the preheating temperature, where introducing the preheating section was effective in inhibiting cation mixing and improving cation ordering at certain temperatures. However, a preheating temperature higher than 325° C. would notably encourage cation mixing. Moreover, the electrochemical tests showed that increasing the preheating temperature could improve the discharge capacity and stabilize the long-time cycling performance. Overall, carefully choosing the preheating temperature of FASP not only improved the particle uniformity by inhibiting the formation of hard-to-break agglomerations in calcinated powders, but also enhanced the electrochemical performance by hindering cation mixing.

Lithium-ion batteries (LIBs) play an increasingly critical role in transportation electrification and grid energy storage of renewable energy such as wind and solar. Unfortunately, the cost of LIB is one of the main barriers limiting its large-scale application. Among different cost factors, cathode materials are an essential one because they are the main contributor that accounts for 39% of the material cost (Refs. 1 and 14). Currently, commonly used cathode materials are lithium iron phosphate ($LiFePO_4$), lithium-nickel-cobalt-aluminum oxide (NCA), and lithium-nickel-cobalt-manganese oxide (NCM). NCM is promising because of its potential in lowering cobalt and increasing nickel content for higher capacity and lower material cost. The most widely used methods for synthesizing NCM cathode materials are the solid-state and coprecipitation methods. Nevertheless, these methods encounter challenges in balancing the manufacturing cost and the material performance. For example, the coprecipitation method suffers issues of using non-continuous batch-based reactors, having many complex operation units, and being a slow synthesis process (Ref 15), resulting in a high manufacturing cost that contributes to 46% of the cathode material cost (Ref. 16).

In contrast, spray-based methods are promising candidates to reduce the manufacturing cost due to having continuous flow conditions, a simple operation system, and a short synthesis time. As a result, spray-based methods have been employed for synthesizing a wide range of materials (Refs. 13 and 17). Among these methods, flame-related ones are preferred for large-scale production due to the high-temperature working condition that allows fast precursor decomposition and the potential for scaling up. For instance, flame spray pyrolysis is used for commercially producing $TiO_2$ and carbon black at the rate of tons per hour (Ref 13).

Different types of NCM cathode materials have been synthesized using flame-based synthesis methods. It was demonstrated that the flame-based spray method could integrate with in situ coating process. Abram et al. reported a flame aerosol synthesis method to produce $Li(Ni_{1/3}Co_{1/3}Mn_{1/3})O_2$(NCM111) and $Li(Ni_{0.8}Co_{0.1}Mn_{0.1})O_2$(NCM811) (Ref 18). With the same method, Yan et al. demonstrated that NCM811 doped with dysprosium could notably improve the cycling performance and thermal-chemical stability (Ref. 19). Moreover, Zhang et al. used glycerol as fuel to synthesize NCM111 and $Li(Ni_{0.8}Co_{0.15}Al_{0.05})O_2$(NCA) (Refs. 5 and 20). They found that the high-temperature flame played an important role in ensuring less porous particles and a shortened post-annealing time. Therefore, flame-based methods are capable of producing cathode material with desired performance. Moreover, a techno-economic analysis has confirmed the potential of using flame-assisted spray pyrolysis to reduce the manufacturing cost of cathode materials (Ref. 21).

Although flame-based spray methods have various advantages over other methods, especially due to their potential in reducing the manufacturing cost, current flame-based spray methods still face challenges in matching the electrochemical performance to commercial methods such as coprecipitation. Therefore, different strategies have been applied to investigate the operating parameters such as the solution concentration (Ref 22), solvent type (Ref 5), operating temperature (Refs. 18 and 22), dopants (Ref. 19), post-calcination conditions (Ref. 23), and atomization method (Ref. 15) on the performance of the synthesized cathode materials. For flame-based methods, the droplet drying and pyrolysis process can be considered critical in achieving desired particle morphology and electrochemical performance.

A simple and useful strategy to control the drying and pyrolysis process is introducing a preheating section prior to the high-temperature flame in the synthesis setup. This strategy can be adapted for a flame-assisted spray pyrolysis method (FASP). The preheating temperature was found to prompt homogeneous precipitation prior to the flame and produce more uniform materials (Ref 18). Moreover, combining the preheating section with flame produced denser particles than the sample using only low-temperature drying (Ref 20). Unfortunately, there are no comprehensive studies examining the role of preheating in FASP in detail. Therefore, the current work investigated the effect of preheating temperature on the particle morphology and electrochemical performance of nickel-rich NCM811 that is considered as the state-of-the-art cathode material. The provided information would be useful for paving the way for producing high-performance NCM811 cathode materials with a low-cost route, which is meaningful for large-scale applications.

Figure 2:
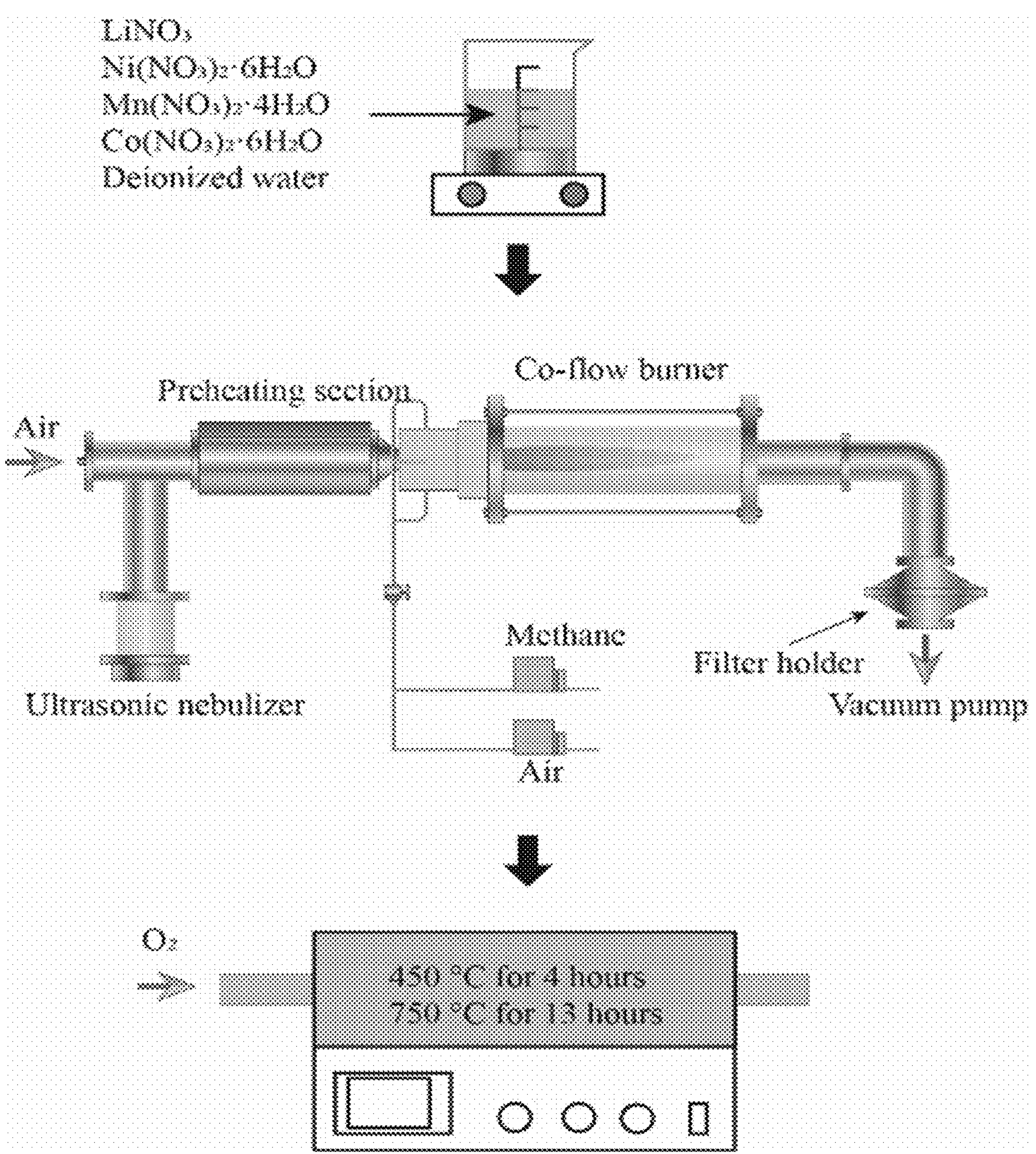
FIG. 2 is a schematic of a synthesis process.

A schematic of the synthesis process is illustrated in FIG. 2. First, the precursor solution was prepared by dissolving lithium nitrate ($LiNO_3$), nickel nitrate hexahydrate ($Ni(NO_3)_2 \cdot 6H_2O$), manganese nitrate tetrahydrate ($Mn(NO_3)_2 \cdot 4H_2O$), and cobalt nitrate hexahydrate ($Co(NO_3)_2 \cdot 6H_2O$) in deionized water with a concentration of 2 mol/L. 10% excess lithium nitrate was added to compensate the Li loss during the synthesis process, so the molar ratio of Li:Ni:Mn:Co is 1.1:0.8:0.1:0.1 in the prepared solution.

The solution was fed to a 1.7 MHz homemade ultrasonic nebulizer to generate droplets. Air was used as carrier gas (5 L/min) to carry droplets to a preheating tube (1.5 m in length, 47.5 mm in inner diameter). The preheating temperature ($T_p$) was defined as the tube wall temperature, which was changed in the range of 25° C. (room temperature) to 375° C. with a step of 50° C. The way of defining the preheating temperature follows the commonly used method in different spray-based synthesis routes for cathode material synthesis (Refs. 15 and 22).

Then, the droplets/particles entered a premixed co-flow burner for further decomposition. The burner used a methane/air mixture at a constant equivalence ratio of 0.65 and a flow rate of 16 L/min. After passing through the flame, solid particles were generated and collected by a filter. The as-synthesized powder was then calcinated in a tube furnace at 450° C. for 4 hours and then 750° C. for 13 hours with an oxygen flow of 0.25 L/min.

A PANalytical X'Pert PRO X-ray diffractometer using monochromatic, nickel filtered Cu Kα radiation (Kα1=1.540598 Å and Kα2=1.544426 Å) was used for X-ray diffraction (XRD) tests. The XRD was performed in the 2θ range of 10-90° with a step size of $0.01° s^{-1}$. A Zeiss Merlin high-resolution scanning electron microscope was utilized to perform scanning electron microscopy (SEM). FEI Tecnai (G2 Spirit TWIN, 120 kV) was used to conduct transmission electron microscope (TEM) imaging. Agilent ICP-OES 5100 VDV was employed to perform inductively coupled plasma-optical emission spectrometer (ICP-OES) testing to measure the ratio of elements in samples.

The calcinated sample was then tested for its electrochemical performance by using CR2032-type half-cells. First, the cathode electrode was prepared as a slurry by mixing NCM811 powder as the active material, polyvinylidene fluoride (PVDF) as the binder, and carbon black as the conductive additive at a weight ratio of 8:1:1. The slurry was then coated on an aluminum film (15 μm) with an active material loading of $2.8 \pm 0.2$ mg/cm$^2$. The aluminum film was then vacuum dried in an oven at 100° C. for 24 hours. Then, cathode electrode disks were cut and pressed at a pressure of 7 MPa. Coin cells were then assembled in an argon-filled glovebox with controlled oxygen and moisture level ($O_2$<1 ppm, $H_2O$<1 ppm). Besides the prepared cathode electrode, the coin cell used a Li metal disk as the anode, a separator (Celgard 2320), and a commercial electrolyte with 1 M $LiPF_6$ in ethylene carbonate (EC) and diethyl carbonate (DEC) (EC:DEC=1:1 v/v). The galvanostatic charge-discharge study was performed using a Land CT3001A battery tester in the potential range of 2.7-4.3 V at different C-rates (1 C=200 mA/g).

Figure 3A:
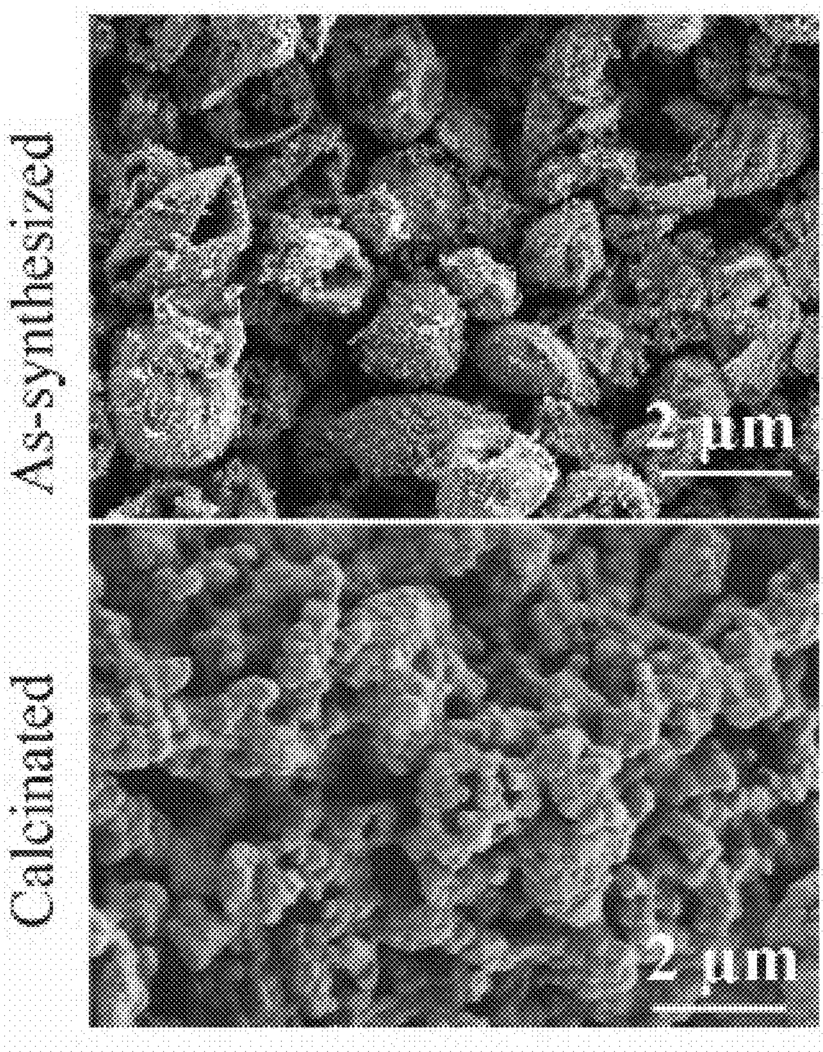
FIGS. 3A-3H are SEM images of as-synthesized (top in each subplot) and calcinated (bottom in each subplot) samples with the preheating temperature of (FIG. 3A) 25° C., (FIG. 3B) 75° C., (FIG. 3C) 125° C., (FIG. 3D) 175° C., (FIG. 3E) 225° C., (FIG. 3F) 275° C., (FIG. 3G) 325° C., (FIG. 3H) 375° C.
Figure 3B:
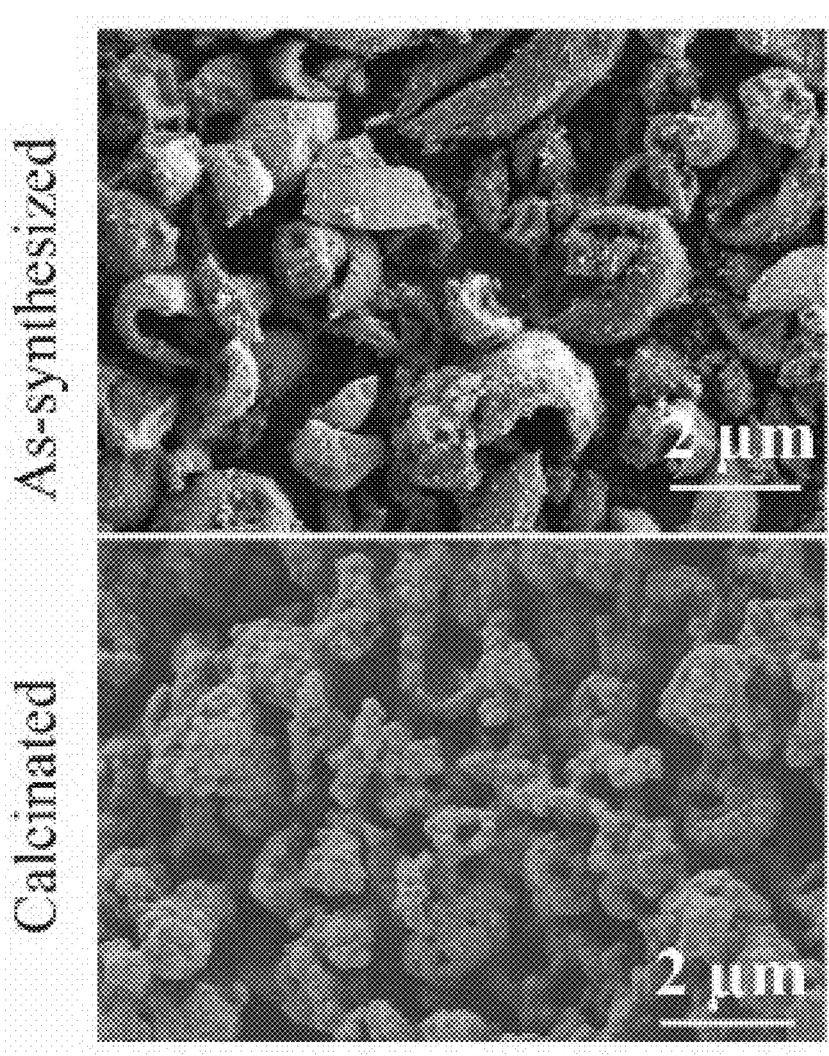
Figure 3C:
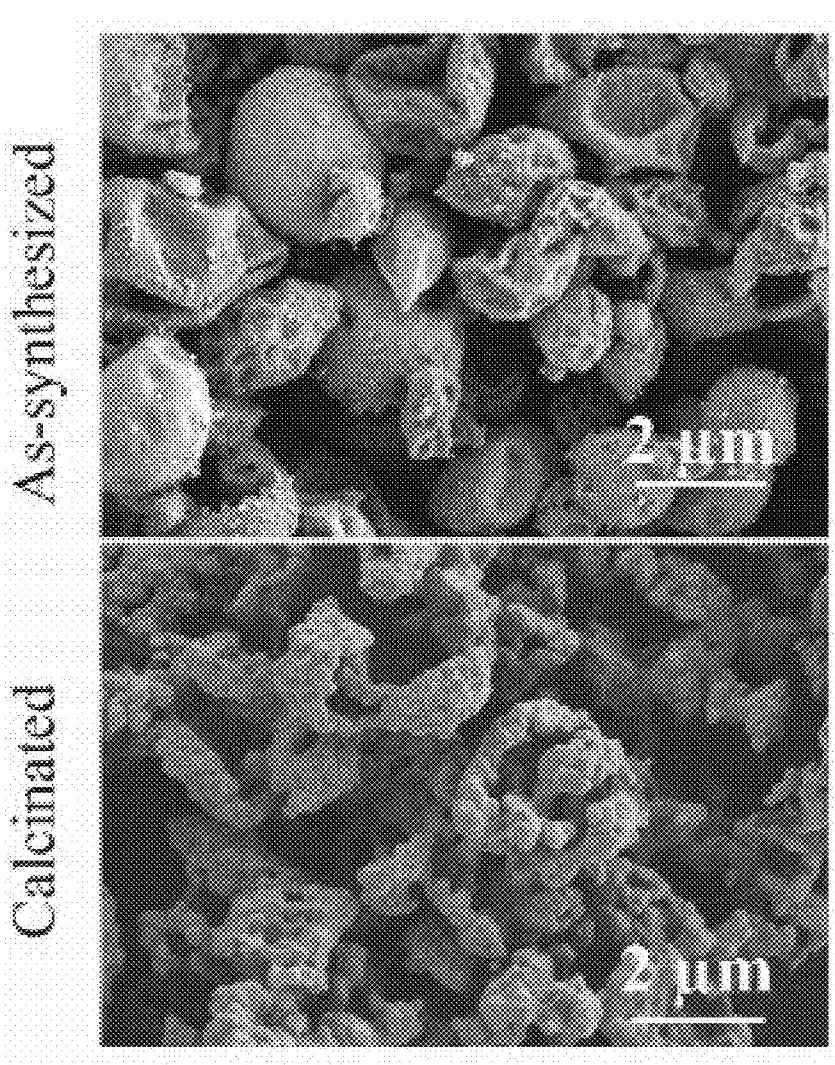
Figure 3D:
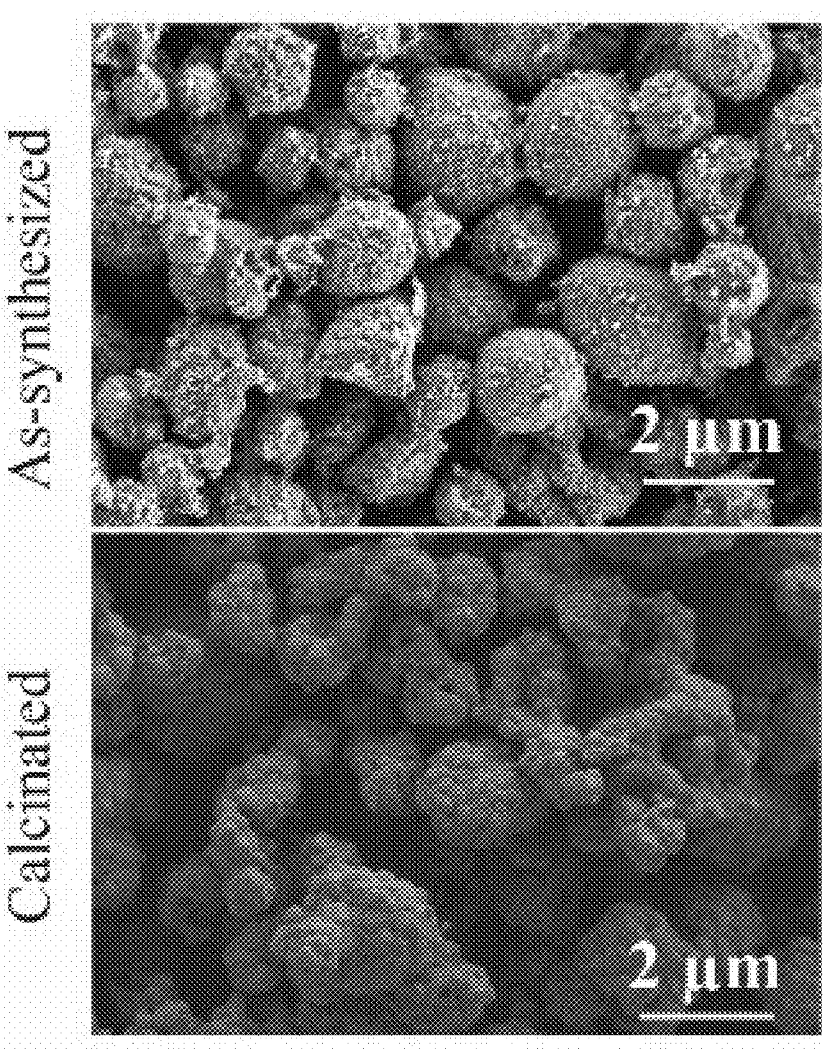
Figure 3E:
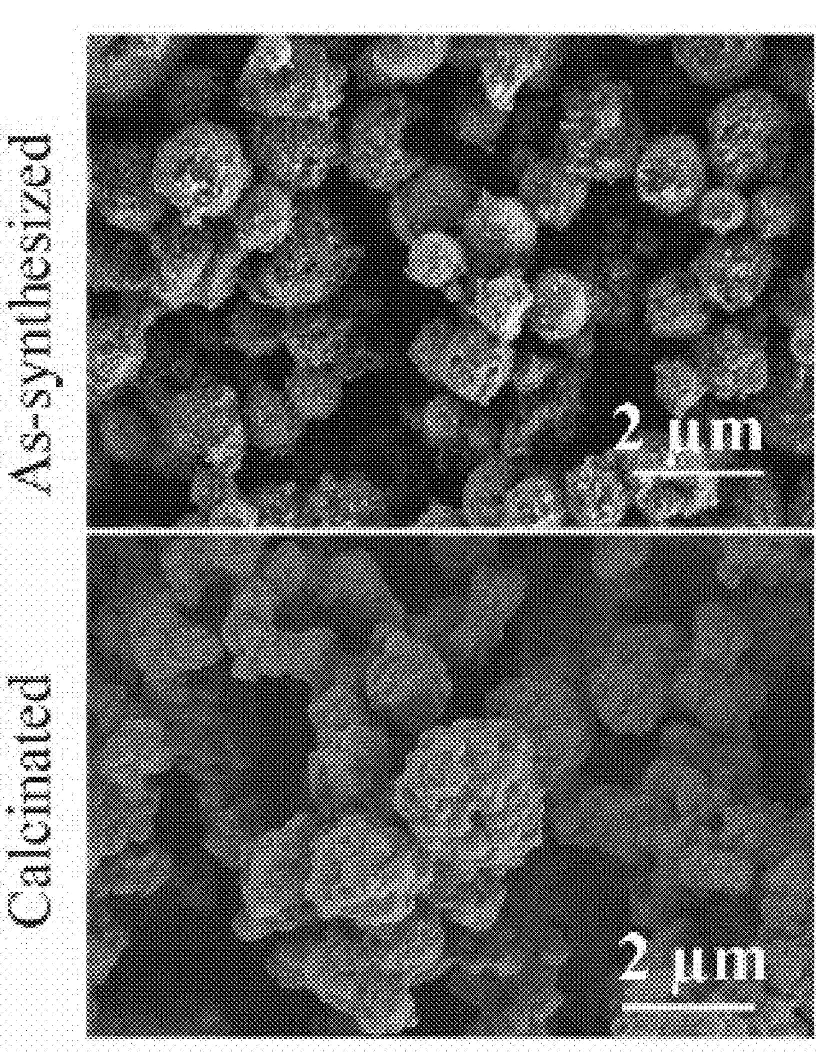
Figure 3F:
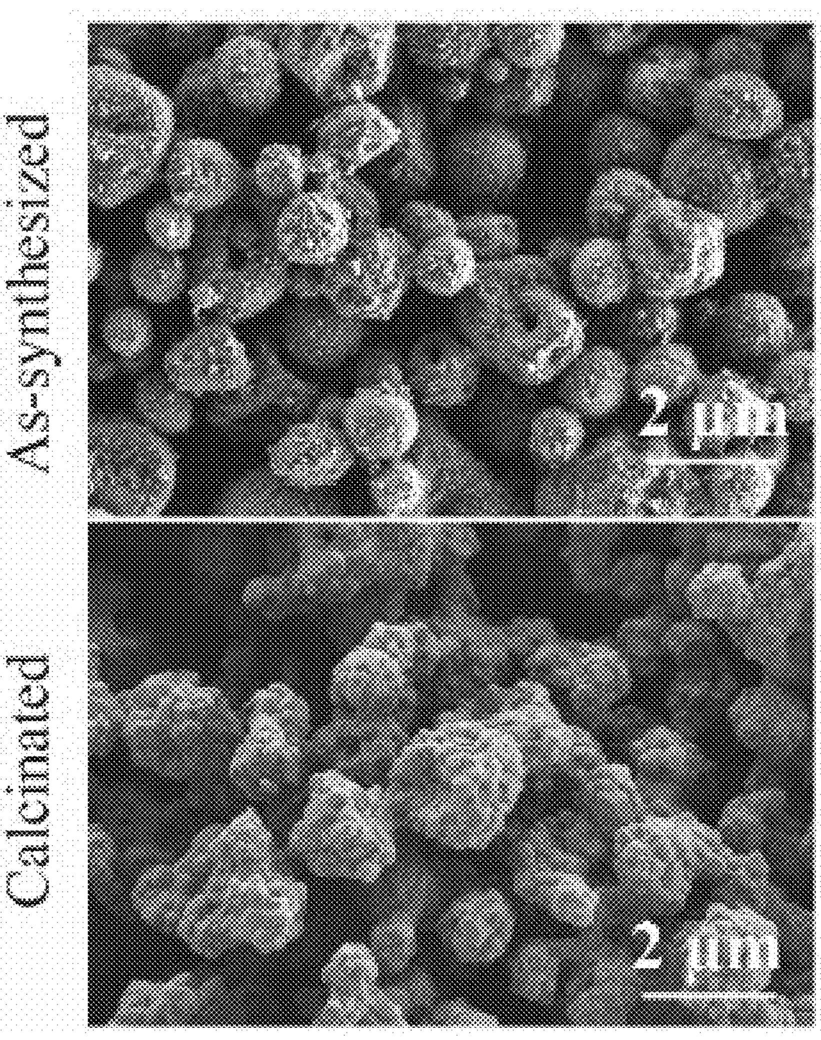
Figure 3G:
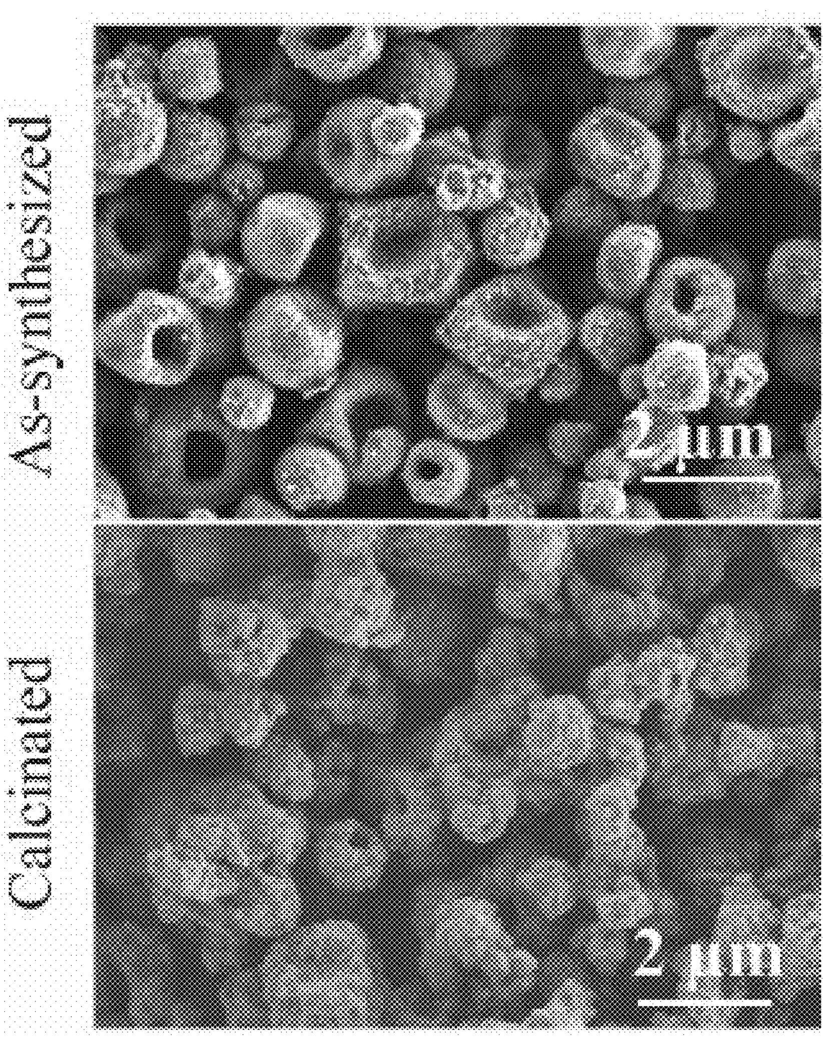
Figure 3H:
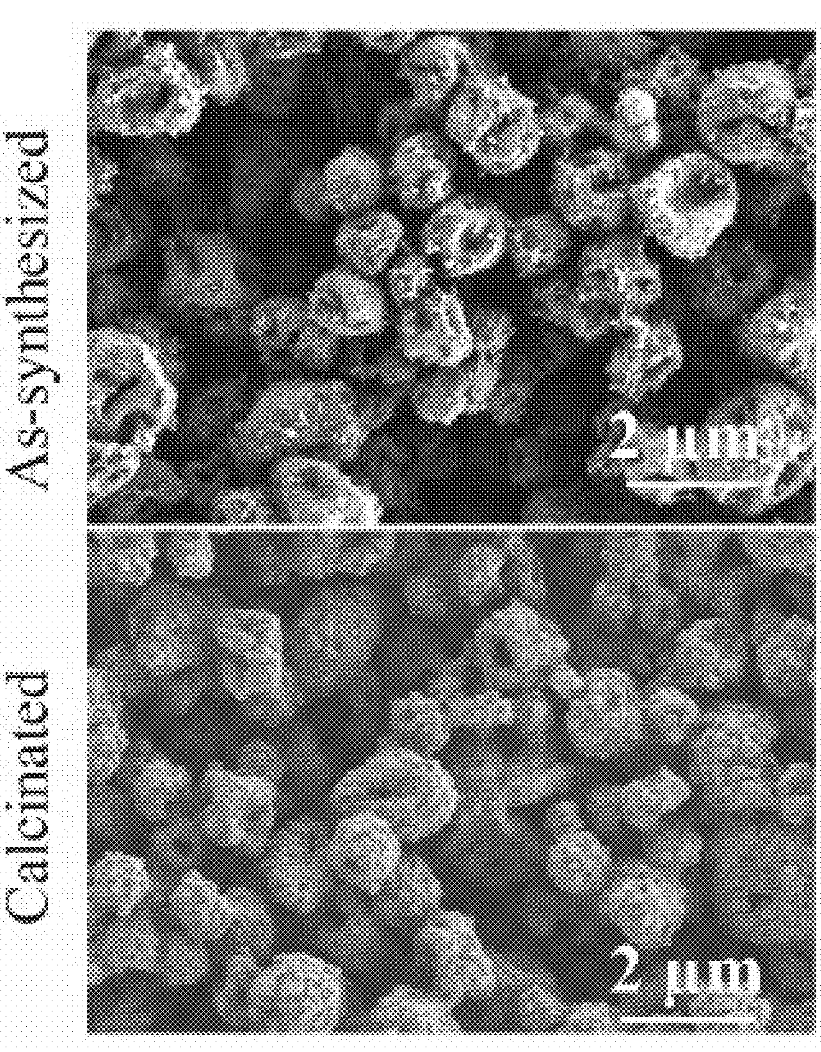

The as-synthesized and calcinated FASP samples were first examined for their morphology. Significant morphology differences are noticed in FIGS. 3A-3H when the preheating temperature changes. At the room temperature of 25° C. without preheating, irregularly-shaped particles are present in the as-synthesized sample shown in FIG. 3A. The particles are apparently broken pieces of hollow particles with a shell. As a result, the calcinated powder comprises agglomerated nanoscale irregularly-shaped primary particles. Similar phenomena are observed for samples with preheating temperatures of $T_p$ at 75° C. (FIG. 3B) and 125° C. (FIG. 3C). Particularly, particles with a hollow structure can be noticed clearly in FIG. 3C. Then, spherical particles start to appear in the as-synthesized sample of $T_p$ of 175° C. (FIG. 3D). The calcinated sample of $T_p$ at 175° C. also contains easily identified spherical particles. As $T_p$ increases to 225° C. (FIG. 3E), the spherical shape is maintained. However, a further increase of $T_p$ to 275° C. leads to particles with holes on the surface as indicated in FIG. 3F. Due to the small size of the hole, the calcinated sample in FIG. 3F has no apparent porous structure because of the crystal growth. As $T_p$ is raised to 325° C. and 375° C., particles with a concave shell dominate (FIGS. 3G and 3H). As a result, the calcinated particles also have holes on the surface.

Figure 3I:
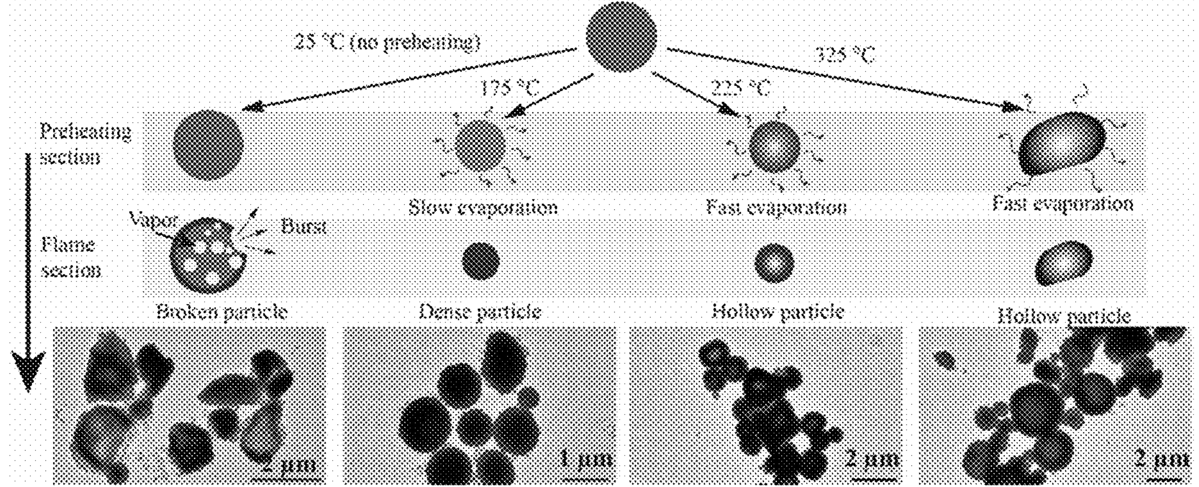
FIG. 3I is a schematic showing a proposed mechanism for the effect of preheating temperature on the particle morphology indicated by TEM images.

The evolution of the particle morphology with the change of $T_p$ is the result of the change in the drying process. The mechanism is discussed schematically in FIG. 3I. With no preheating or when the preheating temperature is low, the droplet is still in the liquid phase when passing the flame. Due to the high temperature of the flame, evaporation is fast. As a result, metal salts precipitate quickly on the droplet surface and form a shell (Ref. 24). Nevertheless, part of the solvent is still left inside the shell because of the fast shell formation. As the remaining solvent evaporates as vapor and builds up pressure inside the shell, it eventually breaks the shell and generates the morphology shown in FIGS. 3A-3C (Ref 25). When the preheating temperature is sufficiently high, early-stage evaporation at a relatively slow rate will tend to produce a particle with a dense structure as shown by the TEM image in FIG. 3I for the sample with $T_p$ of 175° C. Under this condition, passing through the flame is less likely to create broken particles due to largely removed solvent. As a result, the spherical shape dominates in FIGS. 3D and 3E. Nevertheless, the case at $T_p$ of 225° C. starts to form a hollow structure that is indicated by the TEM image in FIG. 3I. A further increase in the preheating temperature will cause fast precipitation and shell formation again. Nevertheless, as the preheating temperature (≤375° C.) is far less than the temperature near the flame (~900° C.), the solvent evaporation is slow so particles only have a collapsed surface but are not broken into pieces. In summary, changing the preheating temperature has largely changed the drying process so it is an efficient way to alter the particle morphology, adding an additional control parameter for designing particles with desired morphology. Generally speaking, samples with irregular shapes, especially broken shells, are less preferred for cathode material applications due to difficulties in controlling the size uniformity for ensuring consistency.

All samples have elemental molar ratios close to the chemical formula of NCM811 with the molar ratio of Li:Ni:Co:Mn=1:0.8:0.1:0.1, confirming the accurate control of the material composition with the current method. However, there is no clear trend about how the preheating temperature affects the composition of as-synthesized and calcinated samples.

Figure 4A:
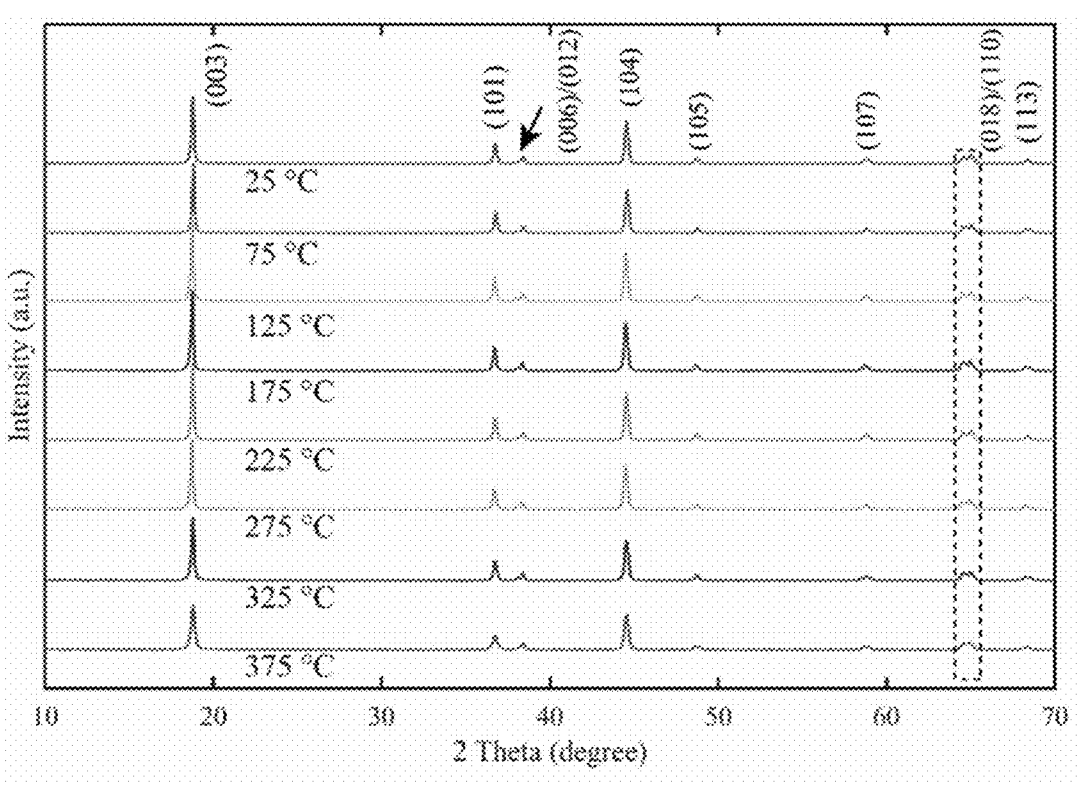
Figure 4B:
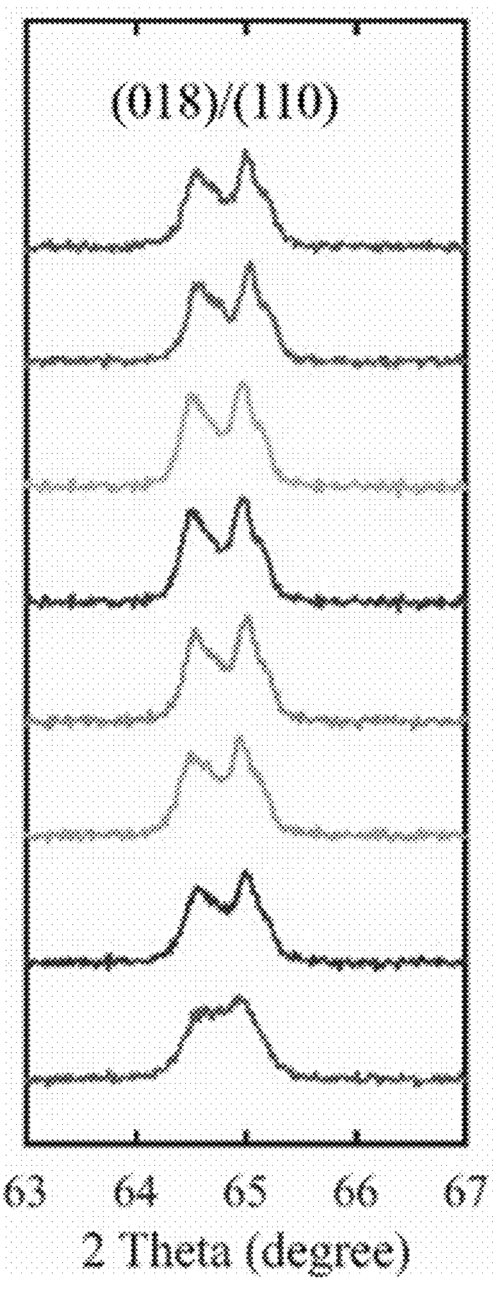
Figure 4F:
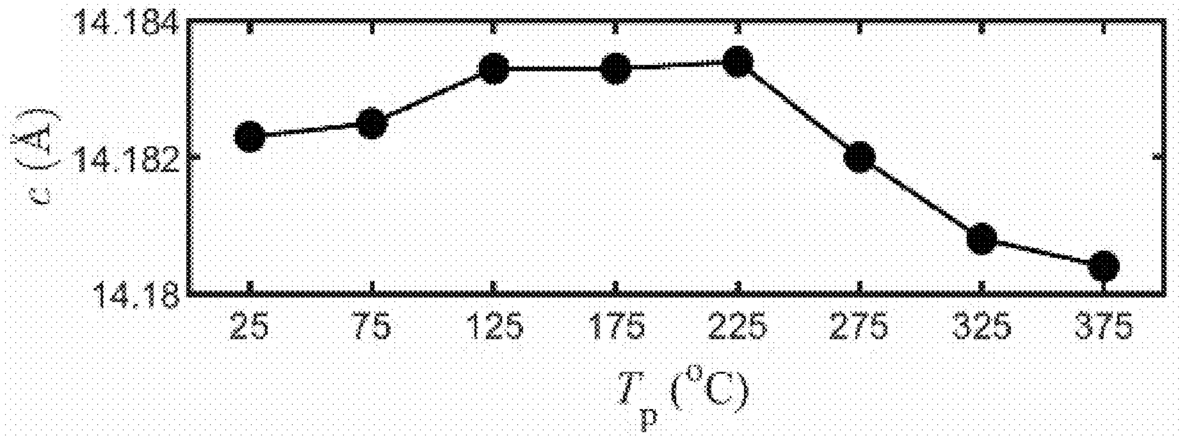

The calcinated samples were examined further with XRD to demonstrate the crystal structure of samples with different preheating temperatures. XRD patterns in FIG. 4A confirm all annealed samples have clear diffraction peaks. They belong to the hexagonal $\alpha$-$NaFeO_2$ type, defining a layered structure with an R3m space group without impurity phases (Ref. 20). FIG. 4A shows the enlarged diffraction peak pair of (018)/(110). As split (018)/(110) indicates an ordered layered structure (Ref. 26), the sample at $T_p$ of 375° C. has non-split peaks so it has a less ordered layered structure than others. One important feature of nickel-rich cathode materials is the cation mixing, which is a result of the similar ionic radius of $Ni^{2+}$(0.69 Å) and $Li^+$(0.76 Å) (Ref 27) because both $Ni^{2+}$ and $Li^+$ have a coordination number of VI(Ref 28. The level of cation mixing can be evaluated by the intensity ratio of peak (003) to (104), marked as $I_{(003)}/I_{(104)}$. Generally, a higher value of $I_{(003)}/I_{(104)}$ indicates a lower level of cation mixing. Moreover, the ratio of lattice parameter c to a (c/a) is an indicator of cation ordering. A larger c/a means a better cation ordering that is preferred for a well-defined hexagonal layered structure (Ref. 29). The layered structure was also confirmed by high resolution TEM images.

As shown in FIG. 4C, the value of $I_{(003)}/I_{(104)}$ first increases with increasing preheating temperature and then drops when the temperature increases further. Among them, the case with a $T_p$ of 375° C. has the highest level of cation mixing. FIG. 4D shows that the value of c/a keeps almost constant up to 225° C., then drops slightly when $T_p$ increases further to 375° C., indicating worsened cation ordering in samples with high preheating temperatures. Moreover, the trend of c/a evolution can be interpreted by the change of the lattice parameter a and c. As shown in FIG. 4E, the value of a tends to increase slightly with the rising temperature. On the other hand, the value of c increases with the temperature first and then drops. For $T_p$ from room temperature to 225° C., both a and c change very mildly, so there are no obvious changes in the value of c/a. Nevertheless, as the preheating temperature increases above 225° C., the lattice parameter a keeps increasing, whereas c starts to drop, leading to a decreasing trend of c/a. The increased lattice parameter a and decreased lattice parameter c are both indicators of the reduced occupancy of Ni ion in 3a site (Ref 27). These results imply that a high preheating temperature could facilitate cation disordering and cation mixing, so it is undesired for synthesizing NCM811.

Figure 5A:
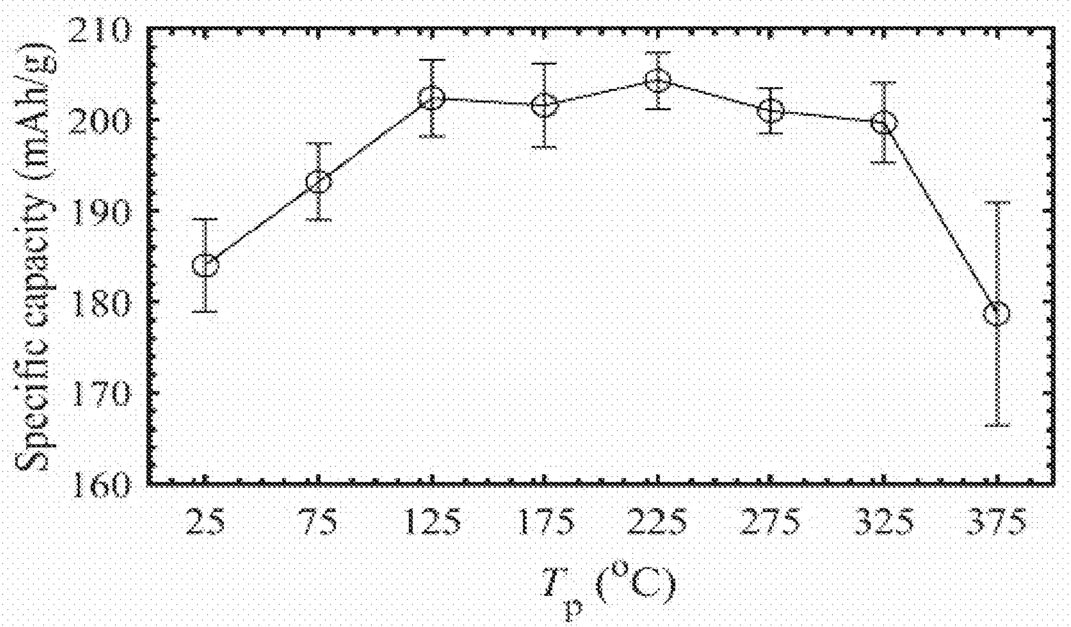
FIG. 5A is a graph depicting the first cycle discharge capacity of and FIG. 5B is a graph depicting the Coulombic efficiency at 0.1 C in the potential range of 2.7-4.3V.
Figure 5B:
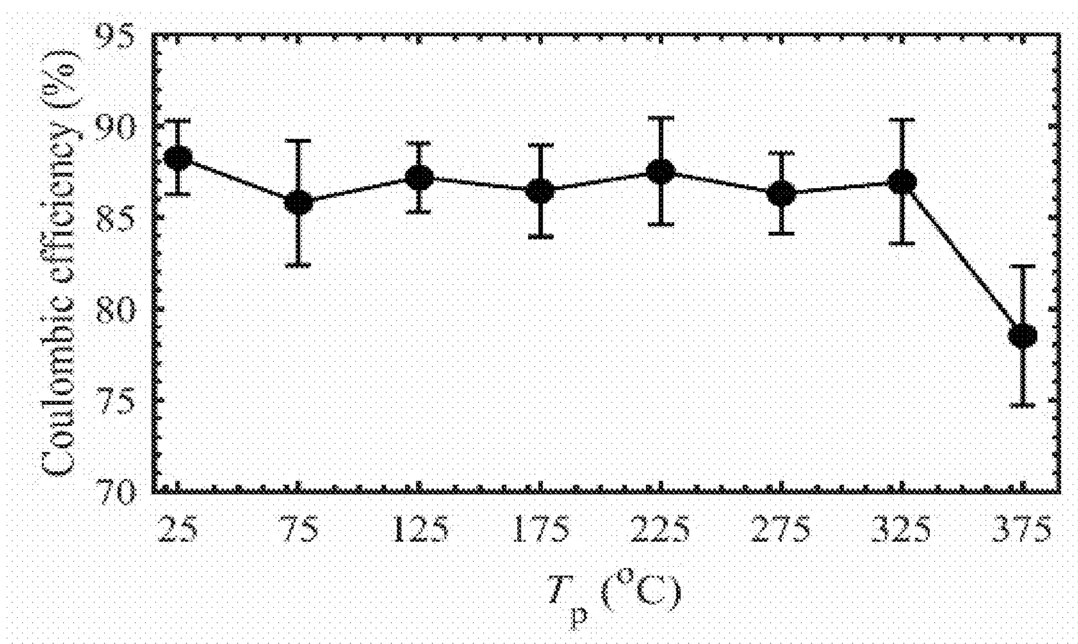

Next, the electrochemical performance of samples using different preheating temperatures was examined. The first cycle discharge capacity and Coulombic efficiency at 0.1 C are shown in FIGS. 5A and 5B, respectively. FIG. 5A shows that the first cycle discharge capacity rises first from around 180 mAh/g to approximately 200 mAh/g and then decreases as the preheating temperature increases more. However, the Coulombic efficiency shows minor changes at around 85% until the preheating temperature reaches 325° C. but then drops when $T_p$ reaches 375° C. This could be the result of the high level of cation mixing and worsened cation ordering noticed for $T_p$ at 375° C. in the XRD results.

Figure 6A:
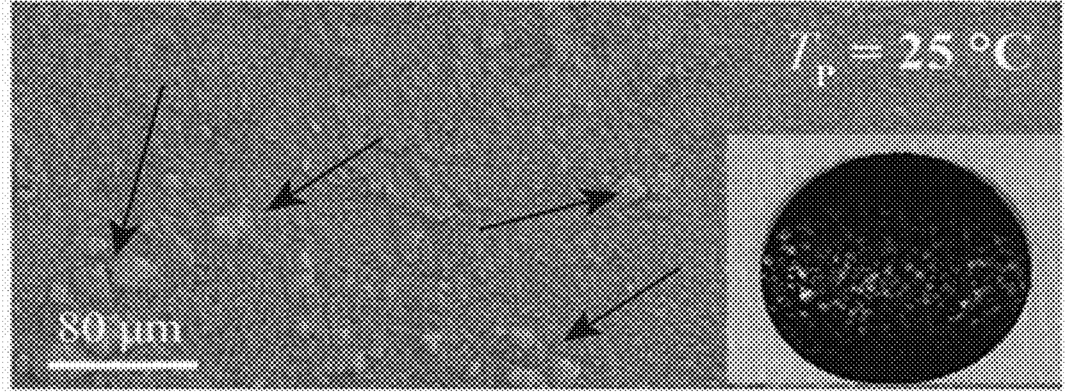
FIGS. 6A-6C are SEM images and photos of prepared electrodes of milled samples after calcination (FIG. 6A) $T_p$=25° C., (FIG. 6B) $T_p$=175° C., and (FIG. 6C) $T_p$=375° C.
Figure 6B:
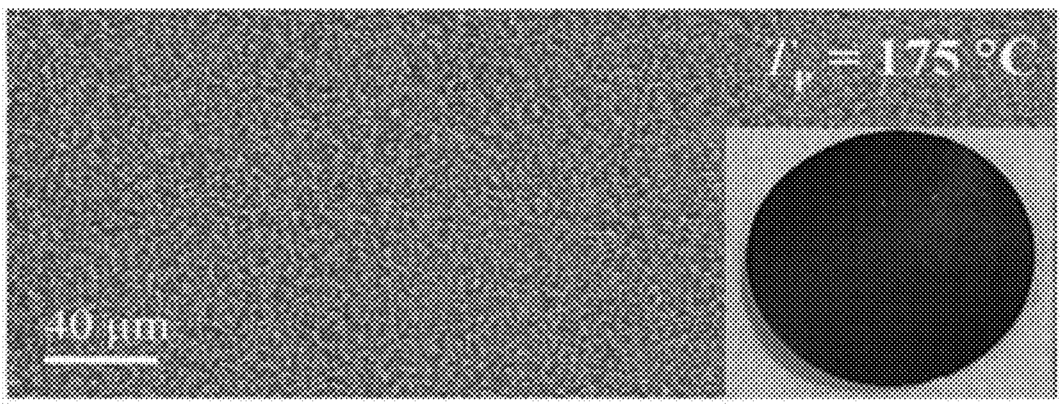
Figure 6C:
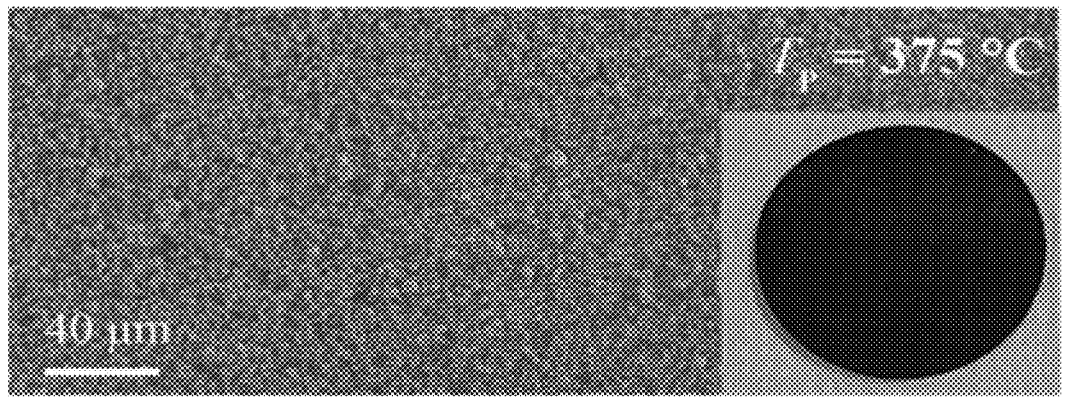

Although the general trend of the discharge capacity matches the trend of the XRD, exceptions are cases with $T_p$=25° C. and $T_p$=75° C. Both cases have relatively low values of discharge capacity even though ordered layered structure and low-level cation mixing were detected (FIGS. 4A-4F), so the quality of crystallization is less likely to be the main reason for the low discharge capacity of samples with low preheating temperatures. Nevertheless, uneven films were noticed for cases with $T_p$=25° C. and $T_p$=75° C. when coating the slurry on the aluminum foil, one of them is shown in FIG. 6A. The low-quality film could reduce the homogeneity of the electrical field, worsening the electrochemical performance (Ref 30). To find the reason for uneven films, calcinated samples were ball-milled and examined for powder uniformity. Selected results are shown in FIGS. 6A-6C to represent as-synthesized samples with broken particles ($T_p$=25° C., FIG. 6A), solid spherical particles ($T_p$=175° C., FIG. 6B), and hollow particles ($T_p$=375° C., FIGS. 6C). As the arrows in FIG. 6A show, agglomerated particles are present in the case with $T_p$ of 25° C., whereas cases with higher $T_p$ of 175° C. and 375° C. have no obvious agglomerations. This confirms that the hard-to-break agglomerations formed in low $T_p$ cases are responsible for the uneven film and the low discharge capacity. Moreover, this demonstrates that introducing the preheating section with properly controlled temperature can significantly improve the powder uniformity by inhibiting the formation of hard-to-break agglomerations.

Figure 7A:
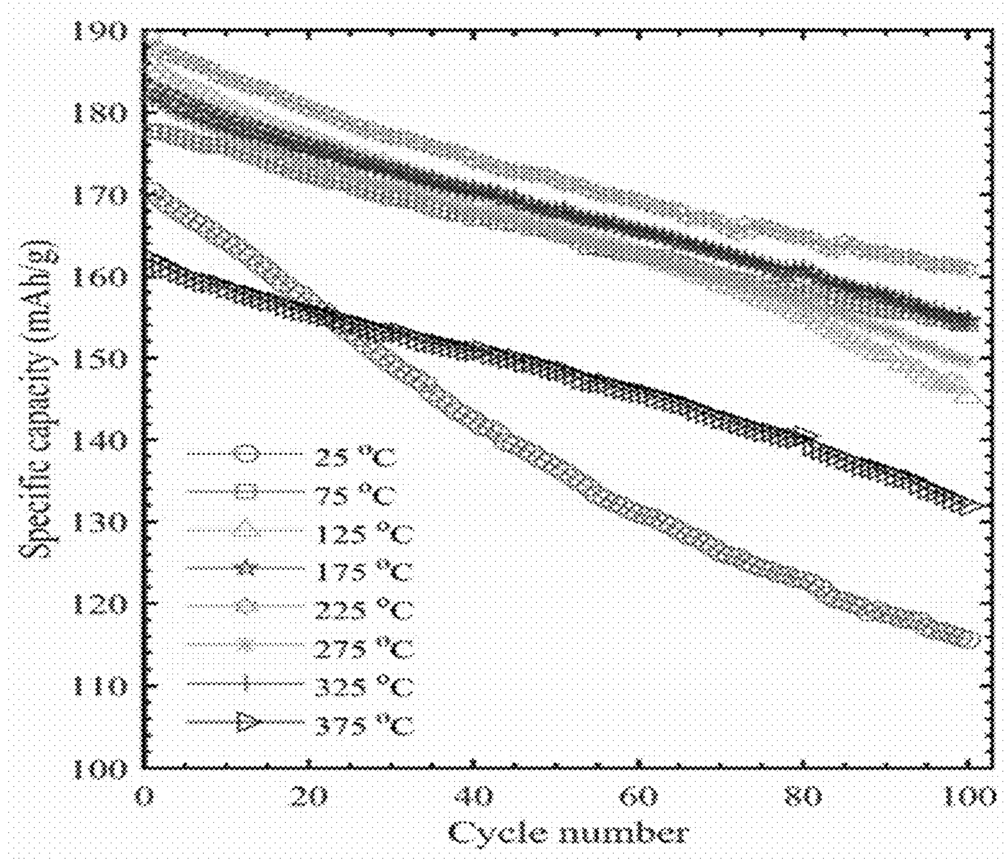
FIG. 7A is a graph depicting cycling curves of different samples at 1 C.
Figure 7B:
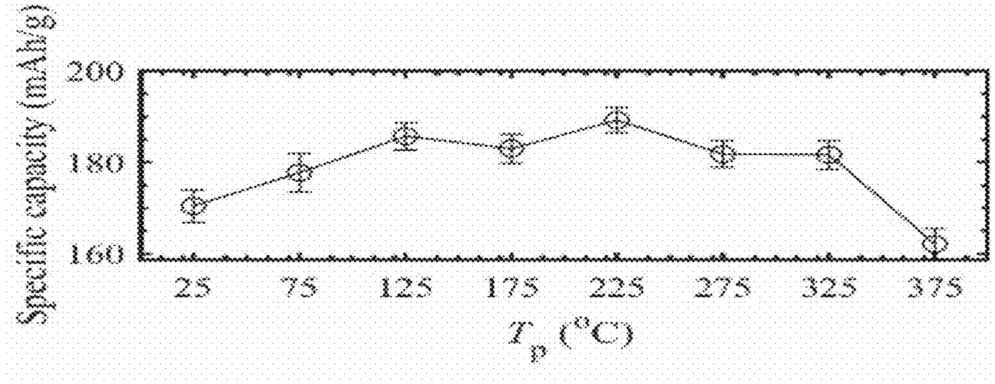
FIG. 7B is a graph depicting the discharge capacity of the 1$^{st}$ cycle at 1 C.
Figure 7C:
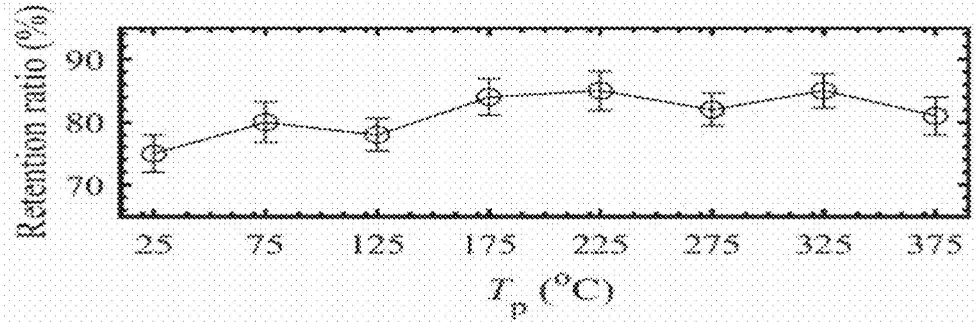
FIG. 7C is a graph depicting the retention ratio after 100 cycles.

Further comparisons were made in the cycling performance at the current rate of 1 C. For the discharge capacity illustrated in FIG. 7B, similar to the trend of discharge capacity at 0.1 C, it increases first from 170 mAh/g ($T_p$=25° C.) to a max value of 189 mAh/g ($T_p$=225° C.) and then drops at higher temperatures ($T_p$>225° C.). Moreover, FIG. 7C demonstrates that samples with $T_p$<225° C. have lower retention ratios than those with a higher $T_p$. Different from the changing trend of the discharge capacity, the retention ratio remains high even when the preheating temperature increases to 375° C., in spite of the low discharge capacity. The overall trend is shown by the cycling curves in FIG. 7A, indicating neither too low (<125° C.) nor too high (>325° C.) preheating temperatures are preferred for synthesizing NCM811 with high capacity and retention ratio.

Figure 8A:
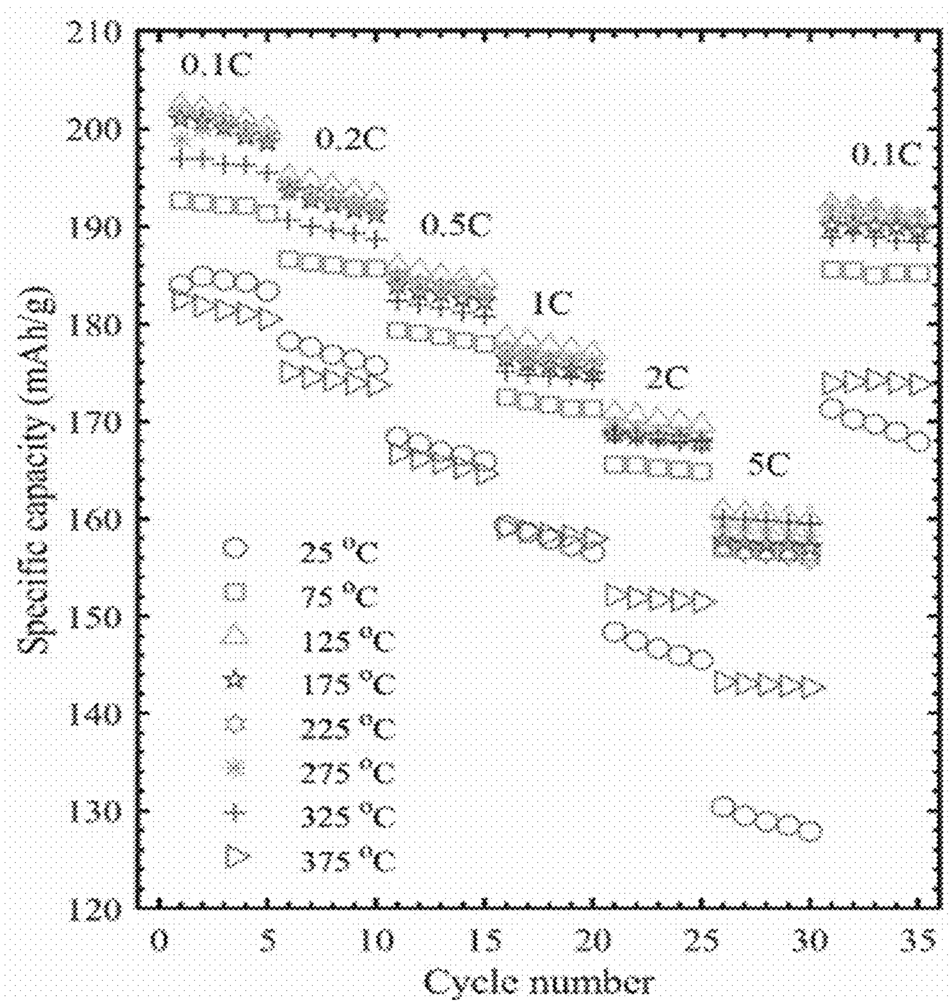
FIG. 8A is a graph depicting the rate performance of different samples.
Figure 8B:
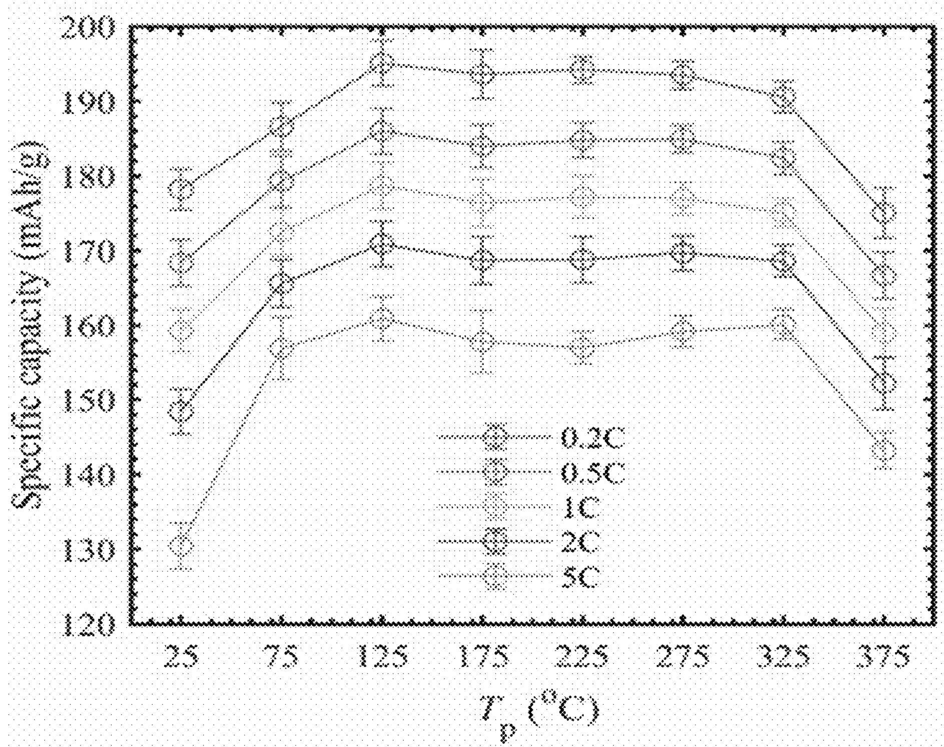
FIG. 8B is a graph depicting the discharge capacity of the 1$^{st}$ cycle at different rates.

The rate performance of different samples is shown in FIGS. 8A-8B. For each sample, the assembled coin cell was cycled at different C-rates (5 times at each C-rate) in the order of 0.1 C, 0.2 C, 0.5 C, 1 C, 2 C, 5 C, and then back to 0.1 C. Overall, the specific capacity decreases with the increasing C-rate because of the limitation of $Li^+$ diffusivity (Ref. 31). FIG. 8A shows that samples at $T_p$ of 25° C. and $T_p$ of 375° C. have lower capacities than other cases. The discharge capacity of the first cycle at different rates was then extracted and shown in FIG. 8B. Consistent with the previous trend of the discharge capacity at 0.1 C and 1C, the discharge capacity at lower C-rates (<2 C) increases and then declines with increasing preheating temperature. Nevertheless, a different trend was noticed when the C-rate increased. The capacity curve at 5 C shows a concave shape in the temperature range of 125° C. to 325° C., implying slightly worsened performance at high C-rates at medium temperatures around 225° C. The difference could be related to the difference in particle morphology. It has been demonstrated in FIG. 2 that the particle is more porous at a low level of preheating temperature (<125° C.) that results in broken particles and at a high level of preheating temperature (>275° C.) that generates large hollow particles. Previous studies have demonstrated that the high C-rate performance would be improved when the particle has a more porous structure because of improved Li-ion diffusion (Refs. 32 and 33).

Generally speaking, when the preheating temperature is well controlled, the morphology and electrochemical performance can be tuned accordingly. When the preheating temperature is too low, irregular particles were produced and caused hard-to-break agglomerations after heat treatment. The agglomerations are undesired for electrode preparation and consequently worsen the electrochemical performance. In contrast, excessively high preheating temperatures tend to produce samples that suffer from a worsened layered structure and a high level of cation mixing. As a result, the sample synthesized at the high temperature of 375° C. has declined electrochemical performance. On the other hand, the preheating temperatures in the range of 175° C. to 325° C. can ensure well dispersed particle with ordered layered structure and a low level of cation mixing, which are desired for high-performance NCM811. The samples described herein are comparable to those already reported (Refs. 23 and 31), confirming that FASP can be used to produce high-quality cathode materials with simple modifications to the process.

The overall calcination process can be significantly simplified by removing preheating and temperature ramping stages, cutting the overall time from over 20 h to only 20 min while still ensuring a layered structure with a low level of cation mixing. The synthesized NCM811 with fast calcination demonstrates promising electrochemical performance, including the high discharge capacity of 198.3 mAh/g at 0.1 C and a good capacity retention ratio of 83.3% after 100 cycles at 1 C. Considering the short residence time in the FASP reactor and shortened calcination time, the overall production time can be reduced by more than an order of magnitude for nickel-rich cathode material production. Moreover, the proposed mechanism implies that the major improvement achieved by urea addition is generating lithium-embedded particles with uniform lithium distribution prior to calcination. This efficient strategy allows the rapid formation of the ordered layered structure under high-temperature conditions without sacrificing performance. These findings would help improve the production procedure of FASP as well as other methods. The insight regarding the mechanism of calcination time reduction can be further leveraged to decrease the energy consumption and build the basis for the high-throughput production of high-performance cathode materials.

The effect of the preheating temperature on the synthesized NCM811 cathode materials using flame-assisted spray pyrolysis is described here. Results showed that the preheating temperature significantly impacted the morphology and electrochemical performance of the synthesized NCM811 cathode materials. Increasing the preheating temperature first eliminated the irregular particles and produced particles with spherical shapes. The temperature rise also improved the uniformity of calcinated powder by eliminating hard-to-break agglomerations. XRD results showed that the cation mixing level and cation ordering were also affected by the preheating temperature. The preheating temperatures below 325° C. led to a low-level cation mixing and ordered layered structure, whereas a high preheating temperature of 375° C. notably worsened the layered crystal structure. The electrochemical performance demonstrated that the discharge capacity at different C-rates (<2 C) increased first with the increasing preheating temperature and reached a stable performance in the range of 125° C. to 325° C. but then declined rapidly when the temperature rose to 375° C. However, the Coulombic efficiency and retention ratio did not follow the same trend. Moreover, the capacity at a high rate of 5 C shows that particles with a porous structure could enhance the performance. Therefore, different effects of the preheating temperature on the electrochemical performance should be balanced for practical applications. Overall, the current work demonstrated that the combustion-based spray method with simple modifications has the capability to produce high-performance nickel-rich cathode materials.

BIBLIOGRAPHY

[1] K. Turcheniuk, D. Bondarev, G. G. Amatucci, G. Yushin. Battery materials for low-cost electric transportation. *Mater Today* (2020).

[2] S. Ahmed, P. A. Nelson, K. G. Gallagher, N. Susarla, D. W. Dees. Cost and energy demand of producing nickel manganese cobalt cathode material for lithium ion batteries. *J Power Sources* (2017);342:733-40.

[3] H.-J. Noh, S. Youn, C. S. Yoon, Y.-K. Sun. Comparison of the structural and electrochemical properties of layered $Li[Ni_xCo_yMn_z]O_2$(x=⅓, 0.5, 0.6, 0.7, 0.8 and 0.85) cathode material for lithium-ion batteries. *J Power Sources* (2013);233:121-30.

[4] H. Wu, X. Pang, J. Bi, L. Wang, Z. Li, L. Guo, et al. Cellulose nanofiber assisted hydrothermal synthesis of Ni-rich cathode materials with high binding particles for lithium-ion batteries. *J Alloys Compd* (2020);829:154571.

[5] J. Zhang, G. Singh, S. Xu, K. Hamad, A. Ratner, Y. Xing. A scalable approach of using biomass derived glycerol to synthesize cathode materials for lithium-ion batteries. *J Clean Prod* (2020);271:122518.

[6] T. Li, X. Li, Z. Wang, H. Guo. A short process for the efficient utilization of transition-metal chlorides in lithium-ion batteries: A case of $Ni_{0.8}Co_{0.1}Mn_{0.1}O_{1.1}$ and $LiNi_{0.8}Co_{0.1}Mn_{0.1}O_2$. *J Power Sources* (2017);342:495-503.

[7] F. Wu, J. Tian, Y. Su, J. Wang, C. Zhang, L. Bao, et al. Effect of $Ni^{2+}$ Content on Lithium/Nickel Disorder for Ni-Rich Cathode Materials. *ACS Appl Mater Interfaces* (2015);7:7702-8.

[8] G. Zha, Y. Luo, N. Hu, C. Ouyang, H. Hou. Surface Modification of the $LiNi_{0.8}Co_{0.1}Mn_{0.1}O_2$ Cathode Material by Coating with $FePO_4$ with a Yolk-Shell Structure for Improved Electrochemical Performance. *ACS Appl Mater Interfaces* (2020);12:36046-53.

[9] S. Zhang, Z. Feng, R. Rajagopalan, D. Sun, C. Huang, Y. Tang, et al. Turn "Waste" into Wealth: A Facile Reviving Strategy for Degraded Ni-Rich $LiNi_{0.8}Co_{0.1}Mn_{0.1}O_2$ Cathodes. *Ind Eng Chem Res* (2022);61:141-51.

[10] M. Nanthagopal, P. Santhoshkumar, N. Shaji, S. Praveen, H. S. Kang, C. Senthil, et al. Nitrogen-doped carbon-coated $Li[Ni_{0.8}Co_{0.1}Mn_{0.1}]O_2$ cathode material for enhanced lithium-ion storage. *Appl Surf Sci* (2019); 492:871-8.

[11] L. Musuvadhi Babulal, C. Yang, S. Wu, W.-C. Chien, R. Jose, S. Jessie Lue. Enhanced performance of a Ni-rich $LiNi_{0.8}Co_{0.1}Mn_{0.1}O_2$ cathode material formed through Taylor flow synthesis and surface modification with $Li_2MoO_4$. *Chem Eng J*(2021); 413:127150.

[12] Y. Shen, H. Xue, S. Wang, Z. Wang, D. Zhang, D. Yin, et al. A highly promising high-nickel low-cobalt lithium layered oxide cathode material for high-performance lithium-ion batteries. *J Colloid Interface Sci* (2021);597: 334-44.

[13] S. Li, Y. Ren, P. Biswas, S. D. Tse. Flame aerosol synthesis of nanostructured materials and functional devices: Processing, modeling, and diagnostics. *Prog Energy Combust Sci* (2016); 55:1-59.

[14] Manthiram A. A reflection on lithium-ion battery cathode chemistry. Nat Commun (2020);11:1550.

[15] Oljaca M, Blizanac B, Du Pasquier A, Sun Y, Bontchev R, Suszko A, Wall R, Koehlert K. Novel $Li(Ni_{1/3}Co_{1/3}Mn_{1/3})O_2$ cathode morphologies for high power Li-ion batteries. *J Power Sources* (2014);248:729-38.

[16] Wood DL, Li J, Daniel C. Prospects for reducing the processing cost of lithium ion batteries. *J Power Sources* (2015);275:234-42.

[17] Leng J, Wang Z, Wang J, Wu H-H, Yan G, Li X, Guo H, Liu Y, Zhang Q, Guo Z. Advances in nanostructures fabricated via spray pyrolysis and their applications in energy storage and conversion. *Chem Soc Rev* (2019);48: 3015-72.

[18] Abram C, Shan J, Yang X, Yan C, Steingart D, Ju Y. Flame Aerosol Synthesis and Electrochemical Characterization of Ni-Rich Layered Cathode Materials for Li-Ion Batteries. *ACS Appl Energy Mater* (2019);2:1319-29.

[19] Yan C, Yang X, Zhao H, Zhong H, Ma G, Qi Y, Koel BE, Ju Y. Controlled Dy-doping to nickel-rich cathode materials in high temperature aerosol synthesis. *Proc Combust Inst* (2021);38:6623-30.

[20] Zhang J, Xu S, Hamad KI, Jasim AM, Xing Y. High retention rate NCA cathode powders from spray drying and flame assisted spray pyrolysis using glycerol as the solvent. *Powder Technol* (2020);363:1-6.

[21] Zang G, Zhang J, Xu S, Xing Y. Techno-economic analysis of cathode material production using flame-assisted spray pyrolysis. *Energy* (2021);218:119504.

[22] Lengyel M, Atlas G, Elhassid D, Luo PY, Zhang X, Belharouak I, Axelbaum RL. Effects of synthesis conditions on the physical and electrochemical properties of $Li_{1.2}Mn_{0.54}Ni_{0.13}Co_{0.13}O_2$ prepared by spray pyrolysis. *J Power Sources* (2014);262:286-96.

[23] Liang Y, Ku K, Lin Y, Yu L, Wen J, Lee E, Libera J, Lu J. Process Engineering to Increase the Layered Phase Concentration in the Immediate Products of Flame Spray Pyrolysis. *ACS Appl Mater Interfaces* (2021);13:26915-23.

[24] Eslamian M, Ashgriz N. Effect of Atomization Method on the Morphology of Spray-Generated Particles. *J Eng Mater Technol* (2006);129:130-42.

[25] Gurav A, Kodas T, Pluym T, Xiong Y. Aerosol Processing of Materials. *Aerosol Sci Technol* (1993);19:411-52.

[26] Weber R, Li H, Chen W, Kim C-Y, Plucknett K, Dahn JR. In Situ XRD Studies During Synthesis of Single-Crystal $LiNiO_2$, $LiNi_{0.975}Mg_{0.025}O_2$, and $LiNi_{0.95}Al_{0.05}O_2$ Cathode Materials. J Electrochem Soc (2020);167:100501.

[27] Zhu J, Chen G. Single-crystal based studies for correlating the properties and high-voltage performance of $Li[Ni_xMn_yCo_{1-x-y}]O_2$ cathodes. *J Mater Chem A* (2019); 7:5463-74.

[28] Shannon R. Revised effective ionic radii and systematic studies of interatomic distances in halides and chalcogenides. *Acta Crystallogr Sect A* (1976);32:751-67.

[29] Huang Z-D, Liu X-M, Oh S-W, Zhang B, Ma P-C, Kim J-K. Microscopically porous, interconnected single crystal $LiNi_{1/3}Co_{1/3}Mn_{1/3}O_2$ cathode material for Lithium ion batteries. J Mater Chem (2011);21:10777-84.

[30] Mohanty D, Hockaday E, Li J, Hensley DK, Daniel C, Wood DL. Effect of electrode manufacturing defects on electrochemical performance of lithium-ion batteries: Cognizance of the battery failure sources. *J Power Sources* (2016);312: 70-9.

[31] Kim J, Lee H, Cha H, Yoon M, Park M, Cho J. Prospect and Reality of Ni-Rich Cathode for Commercialization. *Adv Energy Mater* (2018); 8:1702028.

[32] Müller M, Schneider L, Bohn N, Binder JR, Bauer W. Effect of Nanostructured and Open-Porous Particle Morphology on Electrode Processing and Electrochemical Performance of Li-Ion Batteries. *ACS Appl Energy Mater* (2021);4:1993-2003.

[33] Chen Z, Wang J, Chao D, Baikie T, Bai L, Chen S, Zhao Y, Sum TC, Lin J, Shen Z. Hierarchical Porous $LiNi_{1/3}Co_{1/3}Mn_{1/3}O_2$ Nano-/Micro Spherical Cathode Material: Minimized Cation Mixing and Improved $Li^+$ Mobility for Enhanced Electrochemical Performance. *Sci Rep* (2016);6:25771.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed is:

1. A method of synthesis of a nickel-rich cathode material comprising:

i) preparing a precursor solution by dissolving lithium nitrate, nickel nitrate, manganese nitrate, and cobalt nitrate in water;

ii) aerosolizing the precursor solution in a stream of air using an ultrasonic sprayer to form droplets;

iii) preheating the droplets;

iv) generating a flame in a burner;

v) decomposing the droplets by passing through the burner;

vi) depositing solid particles on a powder collector; and vii) calcinating the solid particles in a furnace in the presence of an oxidizing agent for up to 20 minutes at about 875° C.

2. The method of claim 1, further comprising adding excess $LiNO_3$ to the precursor solution.

3. The method of claim 1, wherein the precursor solution includes urea.

4. The method of claim 1, wherein the nickel-rich cathode material comprises lithium-nickel-cobalt-manganese oxide (NCM).

5. The method of claim 1, wherein the nickel nitrate of the precursor solution includes nickel nitrate hexahydrate ($Ni(NO_3)_2 \cdot 6H_2O$).

6. The method of claim 1, wherein the manganese nitrate of the precursor solution includes manganese nitrate tetrahydrate ($Mn(NO_3)_2 \cdot 4H_2O$).

7. The method of claim 1, wherein the cobalt nitrate of the precursor solution includes cobalt nitrate hexahydrate ($Co(NO_3)_2 \cdot 6H_2O$).

8. The method of claim 1, wherein the droplets are passed through the co-flow burner at a flow rate of about 10 L/min.

9. The method of claim 1, wherein the nickel-rich cathode material comprises an ordered layered structure.

10. The method of claim 1, wherein the nickel-rich cathode material comprises $LiNi_{0.8}Co_{0.1}Mn_{0.1}O_2$(NCM811) or $LiNi_{0.6}Co_{0.2}Mn_{0.2}O_2$(NCM822).

11. The method of claim 10, wherein the nickel-rich cathode material has a discharge capacity of about 198.3 mAh/g (1st cycle at 0.1 C).

12. The method of claim 10, wherein the nickel-rich cathode material has a capacity retention ratio of about 63.15% after 50 cycles at 1 C.

13. The method of claim 1, comprising a liquid-feed flame assisted spray pyrolysis (FASP) method.

14. The method of claim 1, wherein the method is a continuous-flow process.

15. The method of claim 1, wherein the ultrasonic sprayer is a 1.7 MHz ultrasonic sprayer.

16. The method of claim 1, wherein the preheating of the aerosolized droplets comprises heating by passage through two low-temperature preheating sections.

17. The method of claim 1, wherein depositing the solid particles on a powder collector comprises depositing the solid particles on a glass-fiber filter.

18. A method of synthesis of a nickel-rich cathode material comprising:

i) forming droplets of a precursor solution including a nickel salt in a stream of air;

ii) preheating the droplets;

iii) generating a flame in a burner;

iv) decomposing the droplets by passing through the burner;

v) collecting solid particles on a powder collector; and vi) calcinating the solid particles in a furnace in the presence of an oxidizing agent for up to 20 minutes at about 875°C.

19. The method of claim 18, wherein the precursor solution includes urea.

20. The method of claim 18, wherein the nickel-rich cathode material comprises lithium-nickel-cobalt-manganese oxide (NCM).

21. The method of claim 18, wherein the droplets are passed through a preheating zone at a flow rate of between 5 L/min and 20 L/min.

22. The method of claim 21, wherein the droplets are passed through the preheating zone at a flow rate of about 10 L/min.

23. The method of claim 18, wherein preheating the droplets includes tuning the morphology and electrochemical performance of the nickel-rich cathode material by adjusting a preheating temperature and preheating time.

24. The method of claim 18, wherein preheating the droplets includes exposing the droplets to a temperature of 125° C. to 325°C.

* * * * *